(12) United States Patent
Muramatsu

(10) Patent No.: US 6,325,364 B1
(45) Date of Patent: Dec. 4, 2001

(54) FLUID-FILLED ACTIVE ELASTIC MOUNT WHEREIN OSCILLATING MEMBER IS ELASTICALLY SUPPORTED BY TWO ELASTIC SUPPORT MEMBERS

(75) Inventor: Atsushi Muramatsu, Komaki (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/663,268

(22) Filed: Sep. 15, 2000

(30) Foreign Application Priority Data

Sep. 17, 1999 (JP) .................................................. 11-262829

(51) Int. Cl.$^7$ ................................. F16M 5/00; F16F 5/00
(52) U.S. Cl. ......................................... 267/140.14; 267/219
(58) Field of Search ........................ 267/140.14, 140.15, 267/140.13, 219, 220; 180/300, 312

(56) References Cited

U.S. PATENT DOCUMENTS

| | | | | |
|---|---|---|---|---|
| 4,648,576 | * | 3/1987 | Matsui | 267/140.14 |
| 4,650,170 | | 3/1987 | Fukushima | 267/140.1 |
| 6,059,275 | * | 5/2000 | Muramatsu | 267/140.14 |
| 6,105,943 | * | 8/2000 | Nagasawa | 267/140.14 |

FOREIGN PATENT DOCUMENTS

| | | |
|---|---|---|
| 59-1829 | 1/1984 | (JP) . |
| 61-2939 | 1/1986 | (JP) . |
| 10-227329 | 8/1998 | (JP) . |
| 10-311367 | 11/1998 | (JP) . |

* cited by examiner

Primary Examiner—Douglas C. Butler
(74) Attorney, Agent, or Firm—Rossi & Associates

(57) ABSTRACT

Fluid-filled active elastic mount includes a fluid chamber partially defined by an elastic body elastically connecting two spaced-apart mounting members, a movable plate partially defining the fluid chamber and displaceable to change a pressure of the fluid in the fluid chamber, and an actuator constituted by an oscillating force generator having a yoke member, a coil disposed in an annular groove of the yoke member and an oscillating member disposed on one side of said yoke member where the annular groove is open with a predetermined axial distance therebetween, the yoke member being fixedly supported by the second mounting member, while the oscillating member being fixed to the movable plate, so that the oscillating member is oscillated by the magnetic attraction generated upon energizing the coil so as to displace the movable member, wherein at least one of the open end portions of an inner and an outer circumferential wall portion of the yoke member is directly opposed in an axial direction to an inner and/or an outer circumferential portion of the oscillating member, and the oscillating member having an axial protrusion.

14 Claims, 8 Drawing Sheets

FLUID-FILLED ACTIVE ELASTIC MOUNT WHEREIN OSCILLATING MEMBER IS ELASTICALLY SUPPORTED BY TWO ELASTIC SUPPORT MEMBERS

This application is based on Japanese Patent Application No. 11-262829 filed on Sep. 17, 1999, the contents of which are hereby incorporated by reference.

BACKGROUND OF THE INVENTION

1. Field of the Invention

The present invention relates to a fluid-filled active elastic mount of active control type, which is novel in construction and which is suitably utilized as an engine mount for an automotive vehicle so as to exhibit active vibration damping effect with respect to vibration to be damped.

2. Description of the Related Art

As one type of a vibration damping device such as a vibration damping coupling (bushing) or mount, which are interposed between two members of a vibration system for flexibly connecting the two members, there is known an active elastic mount wherein a first and second support member are spaced apart from each other by a given distance and are elastically connected with each other by an elastic body which is interposed therebetween, while an oscillating force generator is disposed between the first and second support member for applying a desirably controlled oscillating force between the first and second mounting member so as to adjust vibration damping characteristics of the mount. JP-A-61-2939 discloses an example of such an active elastic mount which is operable for generating the oscillating force corresponding to the vibration to be damped, and applying the oscillating force to the member of the vibration system whose vibration to be damped, so that the vibration to be damped is actively cancelled by the applied oscillating force, and the spring characteristics of the mount is actively adjusted depending upon the vibration to be damped so as to exhibit a desirably low dynamic spring constant. Thus, the active-type vibration damping mount can enjoy an improved vibration damping capacity. The thus constructed active vibration damping device is considered to apply as an engine mount or a body mount for an automotive vehicle.

The above-described active-type vibration damping mount needs an oscillating force generator which is capable of generating an oscillating force whose frequency is suitably controllable. As disclosed in the above indicated reference, there is proposed to employ as the oscillating force generator a voice-coil type electromagnetic drive device which includes a permanent magnet having opposite magnetic pole faces which are opposite to each other and a moving coil disposed between the opposite magnetic pole faces of the permanent magnet. The moving coil is energized by a controlled electric current, whereby the coil is subjected to a Lorents force or an electromagnetic force, so that the coil is moved to provide the desirably controlled oscillating force.

However, the conventional oscillating force generator of voice-coil type is likely to generate a relatively small oscillating force. In order to generate the desired oscillating force which is large enough to assure a high damping effect, the voice-coil type oscillating force generator tends to be large sized, and the electric power consumed by the generator is inevitably increased. The voice-coil type oscillating force generator also suffers from a problem of heat generated therein. While the moving coil and the permanent magnet is displaced relative to each other in the axial direction thereof upon energizing the moving coil, the moving coil and the permanent magnet are likely to be sliding contact with each other, causing undesirable noise, loss of energy and damage to the contact parts of the moving coil and the permanent magnet.

Another type of oscillating force generator is disclosed in JP-A-10-227329 wherein an electromagnet-type oscillating force generator is employed as the oscillating force generator. Such an electromagnet-type oscillating force generator includes a yoke member made of a magnetic material and having an annular groove open in one of its axially opposite end faces, and a coil accommodated in the annular groove of the yoke member. Upon energizing the coil by application of an electric current thereto, there is generated a magnetic path or circuit around the coil, so that the inner and outer wall portions of the annular groove of the yoke member are magnetized so as to have respective opposite magnetic poles or pole faces on their open end portion. Further the electromagnet-type oscillating force generator includes an oscillating member made of a magnetic material which is opposed to the open end faces of the inner and outer wall portions of the yoke members with a given axial spacing therebetween. In this condition, the coil is energized so that the oscillating force generator generates an electromagnetic force between the oscillating member and the yoke member in the axial direction thereof. This electromagnetic force acts on the oscillating member as an axial oscillating force, causing an axially reciprocal movement of the oscillating member.

The electromagnet-type oscillating force generator permits a high-precise control of the oscillating force in terms of its frequency, phase and the like, by controlling the electric current applied to the coil. Moreover, the electromagnet-type oscillating force generator is capable of generating a sufficiently large oscillating force in comparison with the voice-coil type oscillating force generator.

In the conventional oscillating force generator of electromagnet type, however, the pole faces of the yoke member and the oscillating member are arranged to be directly opposed to each other in a direction in which these two members are displaced relative to each other, that is, in the axial direction thereof, with the predetermined axial spacing therebetween. In this arrangement, the magnitude of the oscillating force generated by the oscillating force generator is significantly influenced by an amount of spacing between the yoke member and the oscillating member. Therefore, a slight difference in an initial position of the oscillating member relative to the yoke member may cause fail in generating desired oscillating force and a resultant fail in exhibiting a sufficient vibration damping effect. Thus, the conventional oscillating force generator is incapable of exhibiting desired damping characteristics with stability.

The electromagnet-type oscillating force generator may be used in an active-type engine mount for an automotive vehicle. When the engine mount is installed on the vehicle, a load or weight of the power unit acts on the engine mount, possibly changing the axial spacing between the yoke member and the oscillating member. Therefore, it is significantly difficult to provide with high preciseness the desired spacing between the yoke member and oscillating members in the engine mount installed on the vehicle, even if the oscillating force generator is manufactured with an improved dimensional accuracy. Thus, the conventional oscillating force generator used in the engine mount suffers from further difficulty in exhibiting desired damping characteristics with stability.

SUMMARY OF THE INVENTION

It is therefore an object of the present invention to provide a fluid-filled active elastic mount which is novel in construction, and which is capable of effectively exhibiting a desired vibration damping effect with stability, even if the mount is installed so that a primary load acts on the mount. The fluid-filled active elastic mount permits an oscillating action of the oscillating member without any interruption by other components, thereby effectively avoiding an undesirable noise and instability of the action of the mount due to a mutual contact between the oscillating member and the other members such as the yoke member.

The above object may be achieved according to the following modes of the invention each of which is numbered like the appended claims and depends from the other mode or modes, where appropriate, to indicate possible combinations of elements or technical features of the invention. However, it is to be understood that the present invention is not limited to those modes of the invention and combinations of the technical features, but may be otherwise recognized based on the thought of the present invention that disclosed in the whole specification and drawings or that may be recognized by those skilled in the art in the light of the disclosure in the whole specification and drawings.

(1) A fluid-filled active elastic mount interposed between two members of a vibration system comprising: (a) a first mounting member and a second mounting member which are spaced-apart from each other, and which are attachable to the two members of the vibration system, respectively; (b) an elastic body elastically connecting the first and second mounting members and partially defining a fluid chamber filled with a non-compressible fluid; (c) a movable plate partially defining the fluid chamber and being displaceable to change a pressure of the fluid in the fluid chamber; and (d) an actuator adapted to oscillate the movable plate and constituted by an oscillating force generator including a yoke member made of a magnetic material and having an annular groove open in one of axially opposite end faces thereof such that the yoke member has an inner and an outer circumferential wall portion which are cooperate to partially define the annular groove, a coil disposed in the annular groove of the yoke member, and an oscillating member made of a magnetic material and disposed opposite to the one end face of the yoke member in an axial direction of the yoke member with a predetermined axial distance therebetween, the yoke member being fixedly supported by the second mounting member, while the oscillating member being fixed to the movable plate, to thereby constitute the actuator, the coil being energized by an electric current applied thereto, so as to form a magnetic circuit around the coil such that the inner and outer circumferential wall portions of the yoke member are magnetized as respective opposite magnetic poles at open end portions thereof, and so as to generate a magnetic force acting on the oscillating member so that an oscillating force is generated between the oscillating member and the yoke member in the axial direction, at least one of the open end portions of the inner and outer circumferential wall portions of the yoke member being directly opposed in the axial direction to an inner and/or an outer circumferential portion of the oscillating member, the inner and outer circumferential portions of the oscillating member being located nearest to the open end portions of the inner and outer circumferential wall portions of the yoke member, respectively, the oscillating member having an axial protrusion extending axially outwardly toward said yoke member, the axial protrusion having a predetermined diameter so that the axial protrusion is locatable radially inwardly and/or outwardly of at least the other of the open end portion of the inner and outer circumferential wall portions of the yoke member, and having at least one edge portion which is opposed to the open end portion of the inner and/or outer circumferential wall portions of the yoke member in a direction inclined to the axial direction; and (e) the oscillating member being elastically supported by a first and a second elastic support member disposed at respective axial positions which are spaced apart from each other in the axial direction, with respect to the respective axial positions on the side of the yoke member.

In the elastic mount of the present invention according to the first mode (1) of this invention described above, the coil of the actuator is energized by applying an electric current thereto, whereby a magnetic field is generated between the opposite magnetic poles of the yoke member. The oscillating member disposed within this magnetic filed is subjected to a magnetic force or attraction, so that the oscillating member is oscillated. This arrangement makes it possible to oscillate the oscillating member in a desired frequency or other intended oscillating conditions, by suitably regulating the frequency or other factors of the electric current applied to the coil.

The yoke member has opposite magnetic poles at respective open end portions of the inner and outer circumferential wall portions thereof. At least one of the opposite magnetic poles is directly opposed to the corresponding inner and/or outer circumferential portions of the oscillating member in a direction in which the oscillating member is displaced, i.e., in the axial direction. At least the other opposite magnetic poles, on the other hand, is opposed to the edge portion of the axial protrusion of the oscillating member in the direction inclined with respect to the axial direction (hereinafter referred to as an "axially inclined direction"). In this arrangement, a sufficiently lager magnetic force or attraction is generated between the magnetic pole(s) of the yoke member and the corresponding portion(s) of the oscillating member to which the magnetic pole(s) is directly opposed in the axial direction. On the other hand, between the magnetic pole(s) and the corresponding edge portion(s) of the axial protrusion of the oscillating member to which the magnetic pole(s) is opposed in the axially inclined direction, there is generated a magnetic force which acts on the oscillating member in the axially inclined direction, making it possible to reduce a variation of the magnitude of the magnetic force applied to the oscillating member with respect to a variation of the axial distance between the yoke member and the oscillating member in the axial direction.

Therefore, the fluid-filled elastic mount of the first mode (1) of the present invention is capable of minimizing the variation of the oscillating force due to dimensional errors especially in the axial distance between the yoke member and the oscillating member, thereby exhibiting a desired oscillating force with effectiveness and stability by regulating the electric current applied thereto. The fluid-filled elastic mount according to the present mode of the invention may be applicable to an active-type vibration damping device such as an active-type engine mount for an automotive vehicle, for example, so that the vibration damping device can effectively exhibits a desired vibration damping effect with an improved stability.

In addition, the fluid-filled elastic mount constructed according to the first mode (1) of the present invention is arranged such that the oscillating member is elastically supported by the first and second elastic support members disposed at respective axial positions which are spaced apart from each other in the axial direction. This arrangement allows an axial displacement of the oscillating member relative to the yoke member, while effectively avoiding a displacement of the oscillating member in a direction perpendicular to the axial direction, and in a twisting direction so that the oscillating member is inclined. Namely, in the twisting-direction displacement of the oscillating member, the oscillating and yoke members which are disposed in a coaxial relationship are rotated in the opposite directions about a rotation axis which intersects the co-axis of the yoke and oscillating members. Therefore, a mutual contact or collision of the oscillating and yoke members is effectively avoided, making it possible to sufficiently minimize an axial gap between the yoke and oscillating members, thereby exhibiting a sufficiently larger oscillating force with high stability.

The fluid-filled elastic mount according to the above mode (1) of the present invention is capable of generate a stable oscillating force to be applied to the movable plate, even if the relative displacement of the yoke and oscillating members is changed depending upon an amount of a static load including the weight of one of the two members to be flexibly supported, which is applied between the first and second mounting members, upon installation of the mount in position, or if the oscillating member is displaced in the twisting direction due to the application of the vibrational load in the direction other than the axial direction, or the like. Therefore, the present fluid-filled elastic mount can exhibit a desired vibration damping effect with high stability.

(2) A fluid-filled active elastic mount according to the above mode (1), wherein the first and second elastic support members being disposed on opposite sides of a protruding end face of the axial protrusion of the oscillating member, respectively, and being arranged such that a resultant elastic support center for elastically supporting the oscillating member by the first and second elastic support members is located on a center axis of the oscillating member and interposed between the first and second elastic support members in the axial direction, the resultant elastic support center being located closer to the protruding end face of the axial protrusion than a first or a second elastic support center for elastically supporting the oscillating member solely by the first or second elastic support member.

In the above mode (2), the axial positions and elastic centers of the first and second elastic support members are suitably dimensioned as described above, permitting an improved deformation resistance of the oscillating member with respect to the load applied in the twisting direction, while effectively avoiding or minimizing variation in an amount of gap between the axial protrusion of the oscillating plate and the inner and/or outer circumferential wall portion (s) of the yoke member, which portions are likely to be contact with each other upon application of the vibrational load in the twisting direction. Therefore, the fluid-filled elastic mount of this mode (2) is advantageous in effectively avoiding the contact or collision of the oscillating member and the yoke member. It is noted that the "resultant elastic support center" should be interpreted as an elastic center of an elastic supporting system in which the movable member is elastically supported by the first and second elastic support members, while "the first or the second elastic support center" should be interpreted as an elastic center of an elastic supporting system in which the movable member is elastically supported solely by the first or the second elastic support member.

(3) A fluid-filled elastic mount according to the above mode (2), wherein the first and second elastic support members being disposed on axially opposite sides of the yoke member and the coil, and being connected with each other via a connecting rod which extends through the yoke member and the coil in the axial direction, while being movable relative to the yoke member and the coil in the axial direction.

In the above mode (3), the yoke member and the coil are interposed between the first and second elastic support members in the axial direction, assuring improved space utilization. In addition, the fluid-filled elastic mount according to this mode of the invention permits a sufficiently large axial spacing between the first and second elastic support members. This arrangement results in a further improved deformation resistance of the oscillating member owing to an effectively increased sprig stiffness of the elastic supporting system utilizing the first and second elastic supporting members, in the direction perpendicular to the axial direction and in the twisting direction.

(4) A fluid-filled elastic mount according to the above mode (1) wherein the first and second elastic support members being disposed on one side of axially opposite sides of a protruding end face of said axial protrusion of the oscillating member, and being arranged such that a resultant elastic support center upon elastically supporting the oscillating member by the first and second elastic support members is located on a center axis of the oscillating member and interposed between the first and second elastic support members in the axial direction, and a first elastic support center for elastically supporting the oscillating member solely by the first elastic support member and a second elastic support center for elastically supporting the oscillating member solely by the second support member are located on a center axis of the oscillating member and axially spaced apart from each other with an axial distance therebetween that is not smaller than an axial distance between the axial positions of the first and second elastic support members.

In the above mode (4), the fluid-filled elastic mount permits a sufficiently large axial spacing between the first and second elastic support centers, resulting in a further improved deformation resistance of the oscillating member owing to an effectively increased spring stiffness of the elastic support system utilizing the first and second elastic support members, in the direction perpendicular to the axial direction and in the twisting direction.

(5) A fluid-filled elastic mount according to any one of the above modes (1)–(4), wherein a distance between the open end portion of the inner or outer circumferential wall portion and the edge portion of the axial protrusion of the yoke member in the direction inclined to the axial direction is made not larger than a distance between the at least one of the open end portions of the inner and outer circumferential wall portions of the yoke member and the inner and/or outer circumferential portions of the movable member which are directly opposed to each other in the axial direction.

The fluid-filled elastic mount according to the above mode (5) of the present invention, is further advantageous in minimize variation of magnitude of the oscillating force due to the variation in the relative distance of the oscillating member and the yoke member.

(6) A fluid-filled elastic mount according to any one of the above modes (1)–(5), wherein the inner circumferential wall portion of the yoke member axially outwardly protrudes from the open end portion of the outer circumferential wall portion of the yoke member, while the axial protrusion of the oscillating member has an inner diameter larger than an outer diameter of the inner circumferential wall portion of the yoke member, the inner circumferential wall portion of the yoke member having an outer circumferential edge in the open end portion thereof, while the axial protrusion having at an open end portion thereof an inner circumferential edge portion which is opposed to the outer circumferential edge portion in the direction inclined with respect to the axial direction, and the outer circumferential wall portion of the yoke member being directly opposed at an open end face thereof to the outer circumferential portion of the oscillating member in the axial direction.

This arrangement facilitates forming between the yoke and oscillating members, both of a pair of portions which are opposed to each other in the axial direction so as to generate therebetween the magnetic attraction in the axial direction, and a pair of portions which are opposed to each other in the axially inclined direction so as to generate therebetween the magnetic attraction in the axially inclined direction.

(7) A fluid-filled elastic mount according to any one of the above modes (1)–(6), wherein the second mounting member having a cylindrical fixing portion and the first mounting member being disposed on one of opposite open ends of the cylindrical fixing portion of the second mounting member, the first and second mounting member being connected with each other by the elastic body interposed therebetween so that the one open end of the cylindrical fixing portion of the second mounting member is fluid-tightly closed by the elastic body, while the other open end of the cylindrical fixing portion of the second mounting member is fluid-tightly closed by a flexible diaphragm, the movable plate being accommodated in an axially intermediate portion of the cylindrical fixing portion of the second mounting member, and being elastically supported by the first elastic support member in the form of a first rubber plate with respect to the axially intermediate portion of the second mounting member, so as to fluid-tightly divide an interior space of the cylindrical fixing portion of the second mounting member into two sections one of which is partially defined by the elastic body and provided as the fluid chamber filled with the non-compressible fluid, and the other of which is partially defined by the flexible diaphragm and adapted to accommodate the actuator therein such that the yoke member of the actuator being fixedly supported by the cylindrical fixing portion of the second mounting member and the oscillating member being elastically supported also by the second elastic support member in the form of a second rubber plate, which is dispose on the axial position so as to cooperate with the flexible diaphragm to define therebetween an equilibrium chamber filled with the non-compressible fluid and having a volume which is variable based on deformation of the flexible diaphragm, the fluid-filled elastic mount further comprising a fluid passage for fluid communication between the equilibrium chamber and the fluid chamber.

In the fluid-filled elastic mount according to the above mode (7) of the present invention, the fluid is forced to flow from the fluid chamber into the equilibrium chamber when the static load acts on the engine mount and causes the elastic deformation of the elastic body, upon installation of the elastic mount in position. Accordingly, the volume of the equilibrium chamber is increased, preventing a rise of the fluid pressure in the fluid chamber due to the static load, resulting in exhibiting a desired vibration damping effect with high stability. In addition, the elastic mount can also exhibit an improved active vibration damping effect and a passive vibration damping effect by utilizing the resonance of the fluid flowing through the fluid passage which is suitably tuned to a desired frequency band, permitting a further improved vibration damping effect.

(8) A fluid-filled elastic mount according to the above mode (7) further comprising: a partition member supported by the second mounting member so as to divide the fluid chamber into a primary fluid chamber partially defined by said elastic body and the an auxiliary fluid chamber partially defined by the movable member; and an orifice passage for fluid communication between the primary and auxiliary fluid chambers.

In the above mode (8), the periodic pressure change of the fluid filling the auxiliary fluid chamber is effectively transmitted to the fluid filling the primary fluid chamber, based on a resonance or flow of the fluid flowing through the orifice passage, thereby exhibiting an excellent vibration damping effect. In addition, the elastic mount of this mode (8) can also exhibit a passive vibration damping effect by utilizing the resonance of the fluid flowing through the orifice passage, as needed. In this case the orifice passage is preferably tuned to a frequency band which is higher than the frequency band to which the fluid passage is tuned. That is, the elastic mount of the present mode (8) can exhibit the above-indicated excellent vibration damping effect with respect to the different frequency bands owing to the resonance of the fluid flowing through the respective fluid and orifice passages.

BRIEF DESCRIPTION OF THE DRAWINGS

The above and optional objects, features, advantages and technical and industrial significance of the present invention will be better understood by reading the following detailed description of present preferred embodiments or modes of the invention, when considered in connection with the accompanying drawings, in which.

DETAILED DESCRIPTION OF THE PREFERRED EMBODIMENTS

Figure 1:
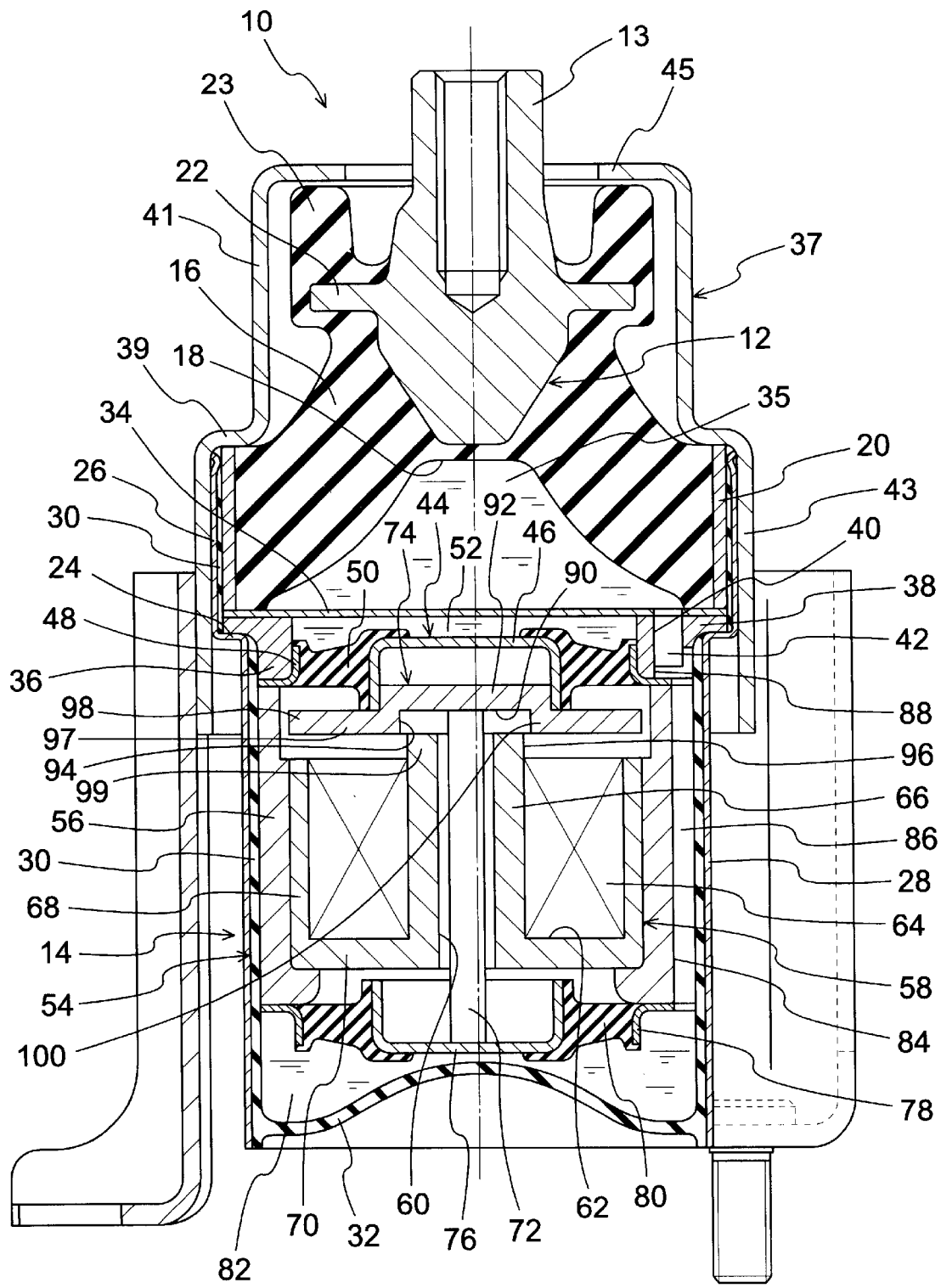
FIG. 1 is an elevational view in axial cross section of an active-type fluid-filled vibration damping device in the form of an automotive vehicle engine mount contructed according to one embodiment of this invention.

Referring first to FIG. 1, an engine mount 10 for an automotive vehicle is shown as one embodiment of the fluid-filled active elastic mount of the present invention. This engine mount 10 includes a first mounting member 12 and a second mounting member 14, which are formed of a suitable metallic material. These first and second mounting members 12, 14 are spaced apart from each other in their axial direction, that is, in the axial direction of the engine mount 10, and are elastically connected to each other by an elastic body 16 interposed therebetween. The first mounting member 12 is attached to the power unit of the vehicle, while the second mounting member 14 is attached to the body of the vehicle, so that the power unit is supported by the vehicle body in a vibration damping fashion.

Described in detail, the first mounting member 12 includes a generally inverted frustoconical body portion, an internally threaded portion 13 and an annular stopper portion 22. The internally threaded portion 13 is formed integrally with the body portion, such that the internally threaded portion 13 extends upwards from the large-diameter end face of the body portion. The internally threaded portion 13 has a tapped hole for engagement with a fixing screw used for attaching the first mounting member 12 to the power unit of the vehicle. The annular stopper portion 22 is also formed integrally with the body portion 11 such that the annular stopper portion 22 extends radially outwardly from the periphery of the large-diameter end of the body portion.

The elastic body 16 is bonded to the inverted frustoconical body portion of the first mounting member 12, in the process of vulcanization of a rubber material to form the elastic body 16. The elastic body 16 is a generally frustoconical member having a relatively large-diameter and an inverted-cup-shaped central recess 18 open in the face of the large-diameter end. The elastic body 16 is formed such that the inverted frustconical body portion of the first mounting member 12 is embedded in the small-diameter end portion of the elastic body 16. To the outer circumferential surface of the large-diameter end portion of the elastic body 16, a metallic sleeve 20 is bonded in the above-indicated vulcanization process. Thus, an integral vulcanized assembly consisting of the first mounting member 12, elastic body 16 and the metallic sleeve 20 are formed. The annular stopper portion 22 is covered by an annular rubber buffer 23 which is integrally formed with the elastic body 16, and extend axially upwardly from the annular stopper portion 22 as seen in FIG. 1.

The second mounting member 14 is a generally cylindrical member having a relatively large-diameter, which consists of an intermediate shoulder portion 24, an upper large-diameter cylindrical portion 26 located on one of opposite sides of the shoulder portion 24, and a lower small-diameter cylindrical portion 28 located on the other side of the shoulder portion 24. A sealing rubber layer 30 is formed on and bonded to the inner circumferential surfaces of the larger- diameter and small-diameter cylindrical portions 26, 28, in the process of vulcanization of a rubber material to form the sealing rubber layer 30. A flexible diaphragm 32 is made of a disk-shaped thin rubber layer and disposed on the side of the open end of the small-diameter cylindrical portion 28. The flexible diaphragm 32 is bonded at its periphery to the lower end portion of the lower small-diameter portion 28, in the process of vulcanization of a rubber material to form the flexible diaphragm 32. Thus, the lower open end of the lower small-diameter cylindrical portion 28 is fluid-tightly closed by the flexible diaphragm 32. In the present embodiment, the flexible diaphragm 32 is formed integrally with the sealing rubber layer 30.

The second mounting member 14 is fixed to the large-diameter end portion of the elastic body 16, with its upper larger-diameter end portion 26 being press-filled on the metallic sleeve 20 by a suitable method, e.g., by a pressing or a drawing operation. In this arrangement, the first and second mounting members 12, 14 are disposed in a coaxial relationship, while being spaced apart from each other in the axial direction and being elastically connected with each other by the elastic body 16. With the second mounting member 14 fixed to the elastic body 16 as described above, the upper open end of the second mounting member 14 is fluid-tightly closed by the elastic body 16. Thus, the second mounting member 14, elastic body 16 and the flexible diaphragm 32 cooperate with each other to define a fluid-tight enclosed space of the second mounting member 14.

The engine mount 10 further includes a cylindrical stopper member 37 which is made of a rigid material like steel and has a generally cylindrical shape. Described more specifically, the cylindrical stopper member 37 has a shoulder portion 39 at an axially intermediate portion thereof, and an upper small-diameter portion 41 and a lower large-diameter portion 43 formed on the opposite sides of the shoulder portion 39, respectively. The lower large-diameter portion 43 is press-fitted on the upper large-diameter portion 26 of the second mounting member 14 by a suitable method, e.g., by a pressing or a drawing operation. The upper small-diameter portion 41 is bent axially inwardly by a suitable radial length so as to form an integrally formed annular abutting portion 45. Thus, the abutting portion 45 of the cylindrical stopper member 37 is opposed to the annular stopper portion 22 of the first mounting member 12 in the axial direction with a given spacing therebetween. Upon application of a relatively large vibrational load to the engine mount 10, the annular stopper portion 22 is brought into abutting contact with the abutting portion 45 via the rubber buffer 23, so as to limit a maximum displacement of the first mount member 12 in a rebounding direction, that is, in an axial direction away from the second mounting member 14.

The present engine mount 10 further includes a partition member 34 disposed or accommodated within an axially intermediate part of the second mounting member 14, which is interposed between the elastic body 16 and the flexible diaphragm 32. The partition member 34 is made of a rigid material such as metal and synthetic resin materials and has a disk-like shape. The partition member 34 is disposed so as to extend in a direction perpendicular to the axial direction of the engine mount 10, and is fixed to the second mounting member 14 such that the peripheral portion of the partition member 34 is gripped by and between the shoulder portion 24 of the second mounting member 14 and the lower axial end of the metallic sleeve 20. In this arrangement, the fluid-tight enclosed interior space of the second mounting member 14 is fluid-tightly separated by the partition member 34 into two sections located on the opposite sides of the partition member 34, respectively. The partition member 34 cooperates with the elastic body 16 to define therebetween a primary fluid chamber 35 filled with a non-compressible fluid. Upon application of a vibrational load between the first and second mounting members 12, 14, the pressure in primary fluid chamber 35 are periodically changes due to elastic deformation of the elastic body 16.

The non-compressible fluid filling the primary fluid chamber 35 may be desirably selected from among water, alkylene glycol, polyalkylene glycol and silicone oil, and the like. For ensuring the engine mount 10 to exhibit a sufficiently high vibration damping effect based on flows of the non-compressible fluid (which will be described in detail later), it is desirable to use a non-compressible fluid whose viscosity is not higher than 0.1 Pa·s. The filling of the non-compressible fluid to the primary fluid chamber 35 is advantageously conducted by assembling the above-indicated integral vulcanized assembly 12, 16, 20 and the second mounting member 14 in a mass of the selected non-compressible fluid.

Within an axially intermediate part of the second mounting member 14, there is also accommodated an orifice member 36. The orifice member 36 is an annular block member made of a rigid material such as metal and synthetic resin materials. The orifice member 36 is superposed on one of axially opposite surfaces of the partition member 34 which surface is remote from the primary fluid chamber 35, so that the axially upper open end of the center hole of the orifice member 36 is fluid tightly closed by the partition member 34. The orifice member 36 has a radially outer flange portion 38 integrally formed in and radially outwardly extending from its outer periphery. The radially outer flange portion 38 is gripped by and between the shoulder portion 24 of the second mounting member 14 and the lower axial end of the metallic sleeve 20, together with the peripheral portion of the partition member 34, whereby the orifice member 36 is fixed to the second mounting member 14.

On the axially lower end portion of the orifice member 36 as seen in FIG. 1, there is superposed a movable member 44, so that the axially lower open end of the center hole of the orifice member 36 is fluid tightly closed by the movable member 44. The movable member 44 includes an inverted cup shaped movable plate 46 made of metal, a cylindrical fixing sleeve 48 which is made of metal and extends in the circumferential direction with a constant "L" shape in its cross section, and an first elastic support member in the form of a first rubber plate 50 having an annular shape. The cylindrical fixing sleeve 48 is disposed radially outwardly of the movable plate 46 with a suitable radial distance therebetween, and the first rubber plate 50 is interposed between the movable plate 46 and the fixing sleeve 48. The first rubber plate 50 is bonded at its inner circumferential surface to the cylindrical wall portion of the movable plate 46 and at its outer circumferential surface to the fixing sleeve 48, in the process of vulcanization of a rubber material to form the first rubber plate 50. Thus, an integral vulcanized structure consisting of the first rubber plate 50, the movable plate 46, and the fixing sleeve 48 is formed as the movable member 44.

The movable member 44 is fixed to the orifice member 36 such that the fixing sleeve 48 is press-fitted into the axially lower end portion of the center hole of the orifice member 36, so as to fluid tightly close the axially lower open end of the center hole of the orifice member 36. Thus, the orifice member 36, the partition member 34 and the movable member 44 mutually cooperate to define therebetween an auxiliary fluid chamber 52 fluid tightly a closed and filled with the non-compressible fluid used in the fluid in the primary fluid chamber 35. In the auxiliary fluid chamber 52, the movable member 44 is elastically moved or displaced so as to generate a change in the pressure in the auxiliary fluid chamber 52.

The orifice member 36 has a circumferential groove 40 open in its upper end face (as seen in FIG. 1) and extending in its circumferential direction with a circumferential length which is slightly smaller than a value corresponding to the entire circumference of the orifice member 36. The opening of the circumferential groove 40 is fluid-tightly closed by the partition member 34, to thereby provide an orifice passage 42 extending in the circumferential direction. The orifice passage 42 communicates at its one end with the primary fluid chamber 35 through a communication hole formed through the partition member 34, and at the other end with the auxiliary fluid chamber 52 through a communication hole (not shown) formed through the orifice member 36. Thus, the primary and auxiliary fluid chambers 35, 52 are held in communication with each other through the orifice passage 42, so as to permit flows of the non-compressible fluid between the two chambers 35, 52, based on a difference between the fluid pressures in the primary and auxiliary fluid chambers 35, 52.

The orifice passage 42 is suitably dimensioned or tuned in terms of its cross sectional area and its length so that a fluid pressure change in the auxiliary fluid chamber 52 generated by the displacement of the movable member 44 is effectively transmitted to the primary fluid chamber 35, owing to the resonance or flow of the fluid flowing through the orifice passage 42, whereby the engine mount 10 can exhibit actively an excellent vibration damping effect with respect to vibrations within a desired frequency band.

The movable plate 46 of the movable member 44 is actuated by an oscillating force generator in the form of an actuator 54 disposed or accommodated within the lower small-diameter portion 28 of the second mounting member 14. The actuator 54 is disposed on one side of the movable member 44 remote from the auxiliary fluid chamber 52. The actuator 54 includes a holder member 56 having a thick-walled cylindrical shape and an oscillating force generating device includes a yoke member 58, a coil 64 and an oscillating plate 74, which device is accommodated within the holder member 56. The actuator 54 is fixed to and supported by the second mounting member 14, with its holder member 56 being press-fitted in the lower small-diameter portion 28 by a suitably method, e.g., by a press-fitting or a drawing operation. In the presence of the sealing rubber layer 30 which is compressed between the holder member 56 and the lower small-diameter portion 28, the actuator 54 is fluid-tightly fixed to the second mounting member 14. In this condition, the holder member 56 is superposed at its upper axial end face on the lower axial end face of the orifice member 36 via the fixing sleeve 48 interposed therebetween.

The holder member 56 may preferably be formed by a non-magnetic material such as a synthetic resin material and aluminum. The yoke member 58 is made of a ferromagnetic material such as iron. The yoke member 58 has a central through hole 60 extending therethrough in the axial direction, and an annular groove 62 disposed radially outward of the central through hole 60 and open its upper axial end face. In the annular groove 62, there is fixedly accommodated the coil 64. Upon application of the electric current to the coil 64, the yoke member 58 disposed around the coil 64 is utilized to form an annular magnetic path or circuit.

Described in detail, the yoke member 58 includes an inner cylindrical wall portion 66 disposed radially inward of the coil 64, an outer cylindrical wall portion 68 and an annular bottom wall portion 70 by which lower axial ends of the inner and outer cylindrical wall portions 66, 68 are connected to each other, which portions 66, 68, 70 cooperate to form the magnetic circuit. The upper axial ends of the inner and outer cylindrical wall portions 66, 68 are disconnected, so that the magnetic circuit is open in the axially upper end face of the yoke member 58. The inner circumferential wall portion 66 has an axial length which is larger than that of the outer cylindrical wall portion 68 so that the upper axial end face of the inner circumferential wall portion 66 is protrudes axially upwardly by a given axial distance from the upper axial end face of the outer circumferential wall portion 68, and the upper axial end face of the coil 64, as seen n FIG. 1.

Within the central through hole 60, there is located a connecting rod 72 which has a diameter sufficiently smaller than that of the through hole 60 and extends through the through the through hole 60. The axially upper and lower end portions of the connecting rod 72 protrudes axially outwardly from the axially upper and lower open ends of the through hole 60, respectively. To the protruded upper and lower end portions of the connecting rod 72, there are fixed an oscillating plate 74 and a stabilizing plate 76, respectively, so as to extend in the direction perpendicular to the axial direction of the connecting rod 72. That is, the oscillating and stabilizing plates 74, 76 are connected to each other via the connecting rod 72, permitting an integral displacement of the oscillating and stabilizing plates 74, 76 relative to the yoke member 58. Namely, the oscillating and stabilizing plates 74, 76 are spaced apart from each other in the axial direction, while being located on the axially opposite sides of the yoke member 58 and the coil 64, respectively.

The stabilizing plate 76 is a cup shaped metallic member including cavity open in its upper end face and extends in the circumferential direction with a constant "L" shape in its cross section. A fixing sleeve 78 is disposed radially outward of the stabilizing plate 76 with a given radial spacing therebetween. The fixing sleeve 78 is a cylindrical metallic member and is bent radially outwardly at its upper axial end portion so as to provide an outward flange portion. Between the stabilizing plate 76 and the fixing sleeve 78, there is disposed an annular second elastic support member in the form of a second rubber plate 80. The second rubber plate 80 is bonded at its inner circumferential surface to the cylindrical portion of the stabilizing plate 76 and at its outer circumferential surface to the fixing sleeve 78, in the process of vulcanization of a rubber material to form the second rubber plate 80. The outward flange portion of the fixing sleeve 78 is superposed on and fixed to the lower axial end face of the holder member 56, by a suitable method, e.g., by fastening, by welding, or the like. Thus, the stabilizing plate 76 is elastically supported by and positioned relative to the holder member 56 and the second mounting member 14 via the second rubber plate 80.

With the actuator 54 accommodated within the lower small-diameter portion of the second mounting member 14, the stabilizing plate 76 and the flexible diaphragm 32 cooperate to define therebetween an equilibrium chamber 82 whose volume is variable based on deformation or displacement of the flexible diaphragm 32. The equilibrium chamber 82 is also filled with the non-compressible fluid filling the primary and auxiliary fluid chambers 35, 52. The holder member 56 has an axial groove 84 which extends in its axial direction and is open in its outer circumferential surface. The opening of the axial groove 84 is fluid tightly closed by the lower small-diameter portion 28, to thereby provide a fluid passage 86. The fluid passage 86 communicates at its one end with the orifice passage 42 through a communication hole 88 formed through the orifice member 36 and accordingly with the primary fluid chamber 35 through the orifice passage 42. The fluid passage 86 also communicates at the other end with the equilibrium chamber 82 through the communication hole formed through the fixing sleeve 78.

That is, the primary fluid chamber 35 and the equilibrium chamber 82 are held in fluid communication with each other through the fluid passage 86, so as to permit flows of the non-compressible fluid between the two chambers 35, 82. Upon installation of the engine mount 10 to the vehicle, an initial static load, such as a load of a power unit of an automotive vehicle acts on the engine mount 10, causing the deformation of the elastic body 16. In this case, the fluid is forced to flow through the fluid passage 86 from the primary fluid chamber 35 to the equilibrium chamber 82 owing to a displacement or deformation of the flexible diaphragm 32. Thus, a rise of the fluid pressure in the primary fluid chamber 35 due to the initial static load is effectively reduced or eliminated by the transmission of the fluid through the fluid passage 86 from the primary fluid chamber 35 to the equilibrium chamber 82. Upon application of a vibrational load to the engine mount 10, the pressure of the fluid in the primary fluid chamber 35 periodically changes due to elastic deformation of the elastic body 16. On the other hand, a fluid pressure change in the equilibrium chamber 82 is substantially absorbed by elastic deformation or displacement of the flexible diaphragm 32. Accordingly, there arises a difference between the fluid pressure in the two chambers 35, 82, whereby the fluid is forced to flow between the two chambers 35, 82. The engine mount 10 can exhibits an excellent vibration damping effect based on the flow or resonance of the fluid flowing through the fluid passage 86. In the present embodiment, particularly, the length and cross sectional area of the fluid passage 86 are tuned or determined so as to enable the present engine mount 10 to exhibit an intended damping effect based on the resonance of the fluid flowing through the fluid passage 86 with respect to vibrations whose frequency band is lower than the frequency band to which the orifice passage 42 is tuned. For instance, the fluid passage 86 is tuned so that the engine mount 10 exhibits an excellent vibration damping effect with respect to low-frequency vibrations of about 10–15 Hz such as engine shakes, while the orifice passage 42 is tuned so that the engine mount 10 exhibits a sufficiently low dynamic spring constant with respect to medium-frequency vibrations of about 20–30 Hz such as engine idling vibration.

On the other hand, an oscillating plate 74 fixed to the axially upper end of the connecting rod 72 is made of an iron or other ferromagnetic material, and has a thick-walled disk-like shape. The oscillating plate 74 has a central recess 90 which has a generally cylindrical shape and is open in the central portion of its axially lower end face. The oscillating plate 74 also has a central protrusion 92 which is integrally formed in the central portion of the axially upper end face of the oscillating plate 74 so as to protrude axially outwardly (upwardly as seen in FIG. 1) from the axially upper end face, with a constant circular shape in its transverse cross section. In the provision of the central recess 90 and the central protrusion 92, the oscillating plate 74 has a hut-like shape in its axial cross section. The outer diameter of the oscillating plate 74 is made substantially equal to that of the outer circumferential wall portion 68, while an inner circumferential surface 94 of the central recess 90 has a diameter which is made larger than the outer diameter of the inner circumferential wall portion 66 by a predetermined slight amount. In other words, the oscillating plate 74 has an annular protrusion integrally formed in the radially outward portion of the central recess 90 so as to protrudes from the bottom surface of the central recess 90 toward the yoke member 58, namely, in the axially downward direction as seen in FIG. 1. The cylindrical protrusion 97 has an inner diameter which is larger than the outer diameter of the inner circumferential wall portion 66 by a predetermined slight amount. In this arrangement, the oscillating plate 74 is movable toward the yoke member 58 so that the cylindrical inner circumferential surface 94 of the central recess 90 is disposed radially outward of the radially inner cylindrical wall portion 66 of the yoke member 58.

The oscillating plate 74 is located on one side of the movable member 44 which is remote from the auxiliary fluid chamber, and is fixed to the movable plate 46 such that the central protrusion 92 is press-fitted in the cylindrical wall portion of the movable plate 46. In this arrangement, the oscillating plate 74 is elastically supported by and positioned relative to the orifice member 36 and the second mounting member 14 via the first rubber plate 50. That is, the oscillating plate 74 and the stabilizing plate 76 which are integrally connected with each other via the connecting rod 72, are elastically supported at respective axial positions of the second mounting member 14 via the first and second rubber plates 50, 80 which are located on the axially opposite sides of the connecting rod 72 and extend in the direction perpendicular to the axial direction. Thus, the elastic deformations of the rubber plates 50, 80 permit displacements of the oscillating and stabilizing plates 74, 76 in the axial direction.

In the engine mount 10 of the present embodiment constructed as described above, the first and second rubber plates 50, 80 constitute two elastic support members which cooperate to elastically support the oscillating plate 74 at respective axial positions of the yoke member 58, namely, the second mounting member 14. That is, the first and second rubber plates 50, 80 are spaced part from each other in the axial direction, and the yoke member 58 and the coil 64 are disposed between the first and second rubber plates 50, 80.

With the oscillating plate 74 elastically supported by the first and second elastic support members 50, 80, the axially lower end face of the oscillating plate 74 is opposed to the axially upper end face of the yoke member 58 in which the magnetic circuit is opened. Described in detail, the axially upper end face of the outer circumferential wall portion 68 is directly opposed in the axial direction to a peripheral portion 98 of the oscillating member 74, while the axially upper end portion 99 of the inner circumferential wall portion 66 is opposed in a direction inclined with respect to the axial direction (hereinafter referred to as an "axially inclined direction") to an open-end edge portion 100 of the central recess 90, in other words, radially inner circumferential edge portion of the cylindrical protrusion 97. These portions 99, 100 are offset from each other in a direction perpendicular to the axial direction. When the coil 64 is not energized by the electric current and the oscillating plate 74 is not subject to the magnetic force, the oscillating plate 74 is placed in its neutral position in which the axially upper end face of the inner circumferential wall portion 66 and the axially lower end face of the cylindrical protrusion 97 of the central recess 90 are generally flush with each other in a direction perpendicular to the axial direction, in the present embodiment.

Figure 2:
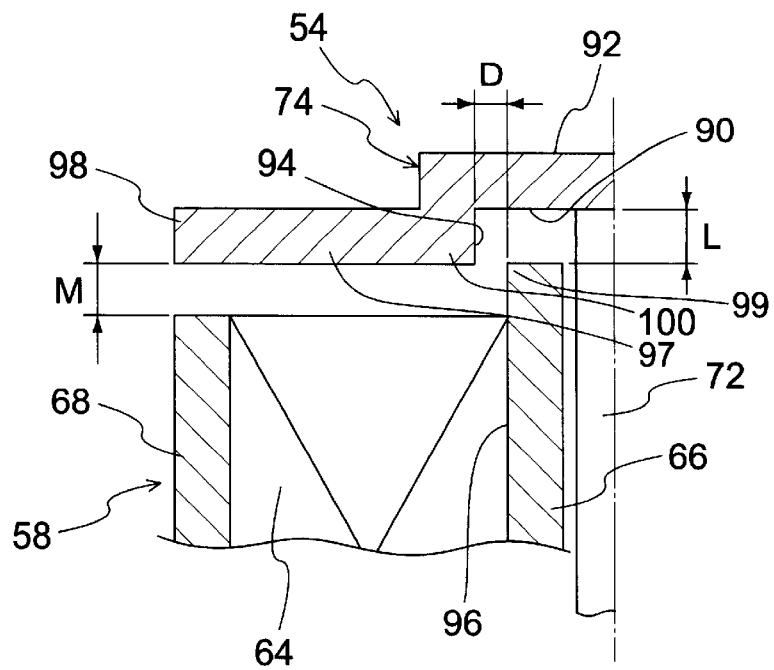
FIG. 2 is a fragmentary enlarged view showing a principal part of the engine mount of FIG. 1.

With the oscillating plate 74 being placed in the above-indicated neutral position, the bottom surface of the central recess 90 is directly opposed in the axial direction to the axially upper end face of the inner circumferential wall portion 66, with a given axial distance therebetween. The axial distance between the bottom surface of the central recess 90 and the axially upper end face of the inner circumferential wall portion 66 is determined to be larger than the distance between the axially upper end portion 99 of the inner circumferential wall portion 66 and the open-end edge portion 100 of the central recess 90 in the axially inclined direction. In the present embodiment, as schematically shown in FIG. 2, the inner circumferential surface 94 of the central recess 90 of the oscillating plate 74 is radially spaced apart from the outer circumferential surface 96 of the inner circumferential wall portion 66 of the yoke member 58 with a predetermined radial distance: D therebetween over their entire circumferences. On the other hand, the axial distance: L between the bottom surface of the central recess 90 and the axially upper end face of the inner circumferential wall portion 66 is determined so as to satisfy the following relationship: $D \leq L$. In the present embodiment, moreover, the axial distance: M between the peripheral portion 98 of the oscillating plate 74 and the axially upper end portion of the outer circumferential wall portion 68 of the yoke member 58 is determined so as to satisfy the following relationship: $D \leq M$.

The oscillating plate 74 desirably positioned in its neutral position as described above, is axially displaceable toward and away from the yoke member 58, owing to the elastic deformation of the first and second rubber plate 50, 80. When the oscillating plate 74 is axially displaced toward the yoke member 58, the axially upper end portions of the inner circumferential wall portion 66 is moved into the central recess 90, without contacting with the central recess 90.

In the thus constructed engine mount 10, the magnetic lines of force generated around the coil 64, upon application of the electric current to the coil 64, pass through the yoke member 58 so as to form the magnetic circuit around the coil 64. Thus, the open end portions of the inner and outer circumferential wall portions 66, 68 of the yoke member 58 have respective opposite magnetic poles. The oscillating plate 74 opposed to open end portions of the inner and outer circumferential wall portions 66, 68 is subject to the magnetic force generated in the opposite magnetic poles, whereby the oscillating plate 74 is moved or attracted toward the yoke member 58, i.e., in the axially downward direction as seen in FIG. 1, based on the magnetic force applied thereto. Therefore, the oscillating plate 74 can be oscillated at an intended frequency and magnitude, by controlling an electric current applied to coil 64, in terms of its amplitude and frequency.

With the oscillating plate 74 oscillated at the intended frequency and magnitude, the pressure in the auxiliary fluid chamber 52 is periodically changed, and the periodic change in the pressure of the auxiliary fluid chamber 52 is transmitted to the primary fluid chamber 35 through the orifice passage 42, so that the pressure in the primary fluid chamber 35 is controlled so as to actively damp the vibration to be damped. Further, the engine mount 10 of the present embodiment can exhibits an effective vibration damping characteristics based on the resonance or flows of the non-compressible fluid flowing through the orifice passage 42 between the two fluid chambers 35, 52. In particular, the engine mount 10 further includes the fluid passage 86 which is tuned to the frequency band different from the frequency band to which the orifice passage 42 is tuned, so that the engine mount 10 can exhibits a passive vibration damping effect with respect to the other frequency vibrations based on the resonance or flows of the non-compressible fluid flowing through the fluid passage 86 between the primary fluid chamber 35 and the equilibrium chamber 82. It is noted that the oscillating plate 74 is actuated by the magnetic force or attraction generated in the yoke member 58 and applied to the oscillating plate 74, so that the oscillating plate 74 can generate a sufficiently large oscillating force, that is not sufficiently attained by means of a voice coil-type actuator.

In addition, the axially upper end portion of the inner circumferential wall portion 66 and the open-end edge portion 100 of the central recess 90 are opposed to each other in the axially inclined direction with the predetermined distance therebetween that is made not larger than the axial distance between the axially upper end face of the inner circumferential wall portion 66 and the bottom surface of the central recess 90, and the axial distance M: between the axially upper end face of the outer circumferential wall portion 68 and the peripheral portion 98. This makes it possible to minimize or reduce an amount of variation in magnetic attraction acting on the oscillating plate 74, with respect to an amount of variation in the relative distance between the yoke member 58 and the oscillating plate 74, even when the neutral position of the oscillating plate 74 relative to the yoke member 58 is undesirably changed or varied, and when the oscillating plate 74 is displaced in the axial direction. Therefore, the engine mount 10 is capable of generating a desired oscillating force with high stability, and accordingly exhibits a desired vibration damping effect with high stability, irrespective of variations of the initial position of the oscillating plate 74 relative to the yoke member 58.

The above-indicated reduction of the amount of variation in the magnetic attraction with respect to the amount of variation in the relative distance between the oscillating plate 74 and the yoke member 58 might be caused by the following technical reasons: Namely, the open-end edge portion 100 of the central recess 90 is opposed in the axially inclined direction to the magnetic pole generated in the axially upper end portion of the inner circumferential wall portion 66, so that axial components of the magnetic attraction generated between the open-end edge portion 100 and the axially upper end portion of the inner cylindrical wall portion 66, acts on the oscillating plate 74 as a driving or oscillating force in the axial direction. In addition, the magnetic pole generated in the axially upper end portion of the inner circumferential wall portion 66 extends axially downward direction along the cylindrical outer circumferential surface 96 of the inner circumferential wall portion 66, while the opposite magnetic pole generated in the open-end edge portion 100 of the central recess 90 also extends axially upward direction along the inner circumferential 94 of the central recess 90. Thus, an effective opposite magnetic poles mutually opposed in the axially inclined direction are axially moved along the respective outer and inner circumferential surfaces 96, 94, with a constant distance therebetween in the axially inclined direction, as the oscillating plate 74 and the yoke member 58 are axially displaced relative to each other. This arrangement is effective to prevent variation in an amount of axial component of the magnetic force or attraction applied to the oscillating plate 74, due to the change of the distance between the effective opposite magnetic poles.

Figure 3:
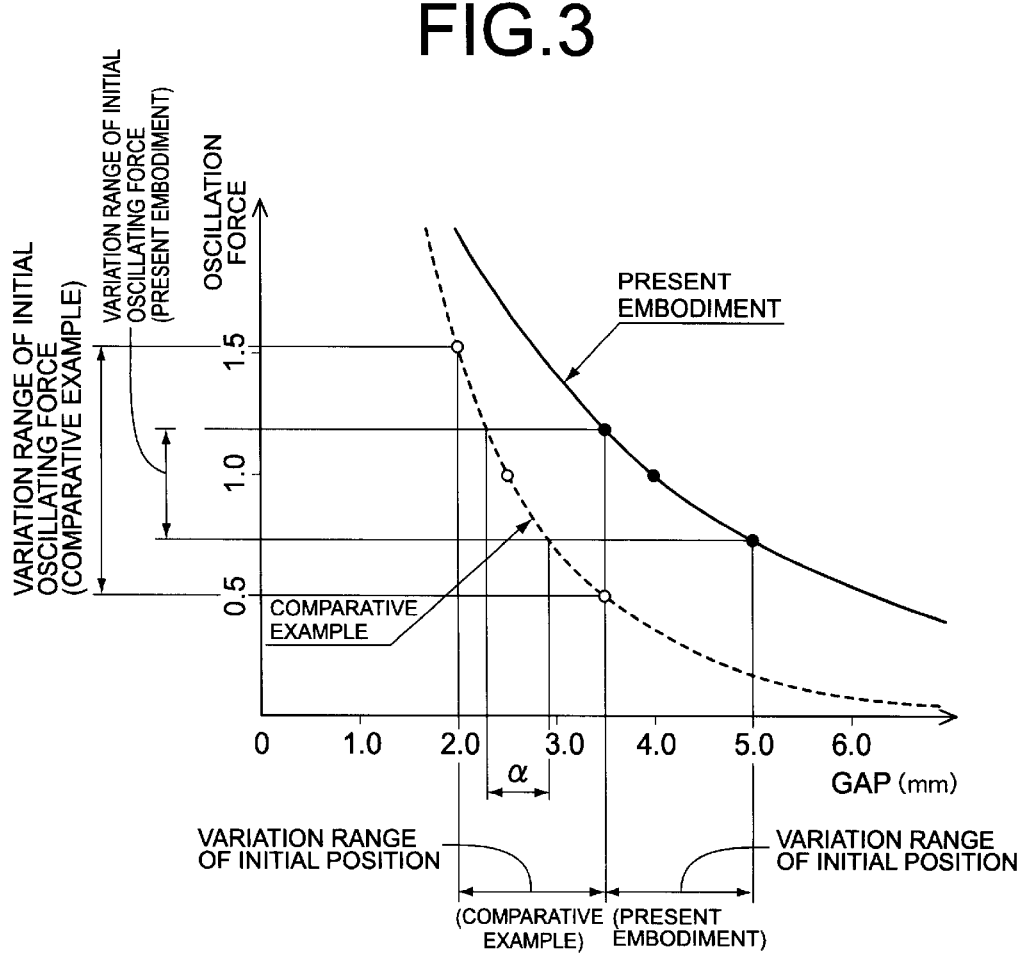
FIG. 3 is a graph showing output characteristics of an oscillating force measured in an actuator of the engine mount of FIG. 1, together with those measured in an actuator of the engine mount according to a comparative example.

The magnitude characteristics of the oscillating force, i.e., the axial driving force applied to the oscillating plate 74 were actually measured in the actuator 54 used in the engine mount 10 of the present embodiment, upon energizing the coil 64 by application of a constant alternating current, with respect to three cases where the axial position of the oscillating plate 74 relative to the yoke member 58 were different. Namely, in a first case, the oscillating plate 74 is placed in its neutral position as described above as illustrated in FIG. 2. In the second case, the oscillating plate 74 is placed in its separate-position where the oscillating plate 74 is displaced by 1 mm from its neutral position in the direction remote from the yoke member 58, while in the third case, the oscillating plate 74 is placed in its close-position where the oscillating plate 74 is displaced by 0.5 mm from its neutral position in the direction close to the yoke member 58. In all cases, the distance: D between the inner and outer circumferential surfaces 94, 96 are set to 1 mm. The result is shown in the graph of FIG. 3 where the measurements with respect to the first case are indicated as a desired value, while the measurements of the second and third cases are indicated in the form of proportional values with respect to the desired value. In the graph of FIG. 3, the gap values correspond to the value of M as shown in FIG. 2.

Figure 4:
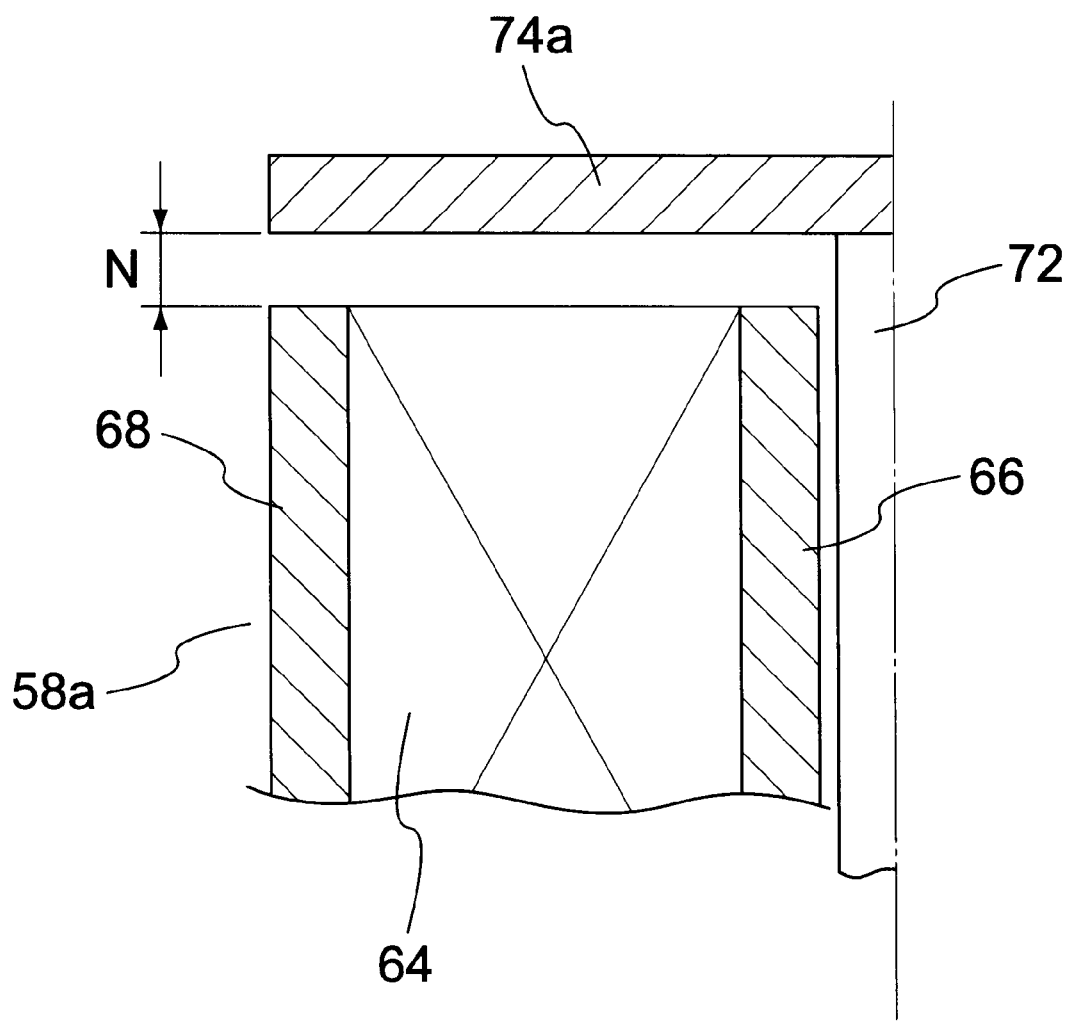
FIG. 4 is a fragmentary enlarged view showing a principal part of the actuator of the engine mount according to the comparative example.

As a comparative example, the magnitude characteristics of the oscillating force were also measured in a conventional actuator as illustrated in FIG. 4, which includes a yoke member 58a in which the inner and outer circumferential wall portions 66, 68 have the same axial dimension, while the oscillating member 74a has an axially lower end face having a flat surface. Like in the actuator 54, the axial distance: N between the oscillating and yoke members 74a, 58a varies in the three cases. In the first case, the oscillating plate 74a is placed in its original position where the axial distance: N has a value of 2.5 mm. In the second case, the oscillating plate 74a is placed in its separate-position where the oscillating plate 74a is displaced by 1 mm from its original position in the direction remote from the yoke member 58a, while in the third case, the oscillating plate 74a is placed in its close-position where the yoke member 58a is displaced by 0.5 mm from its neutral position in the direction close to the yoke member 58a. The magnitude characteristics of the oscillating force were measured with respect to the three cases, and the result is also shown in the graph of FIG. 3 in the same manner as in the actuator 54.

As is apparent from the graph of FIG. 3, the actuator 54 permits a significantly large decrease of the amount of variation of the magnitude of the oscillating force, in comparison with the conventional actuator, even where they have the same amount of variation of the initial position of the oscillating plate 74, 74a. In other words, the conventional actuator is required to held the variation of the initial position of the oscillating member 74a within a very short range: ($\alpha$) as indicated in the graph of FIG. 3, in order to ensure a decreased amount of variation of the oscillating force as in the actuator 54 used in the engine mount 10 of the present embodiment.

Figure 5:
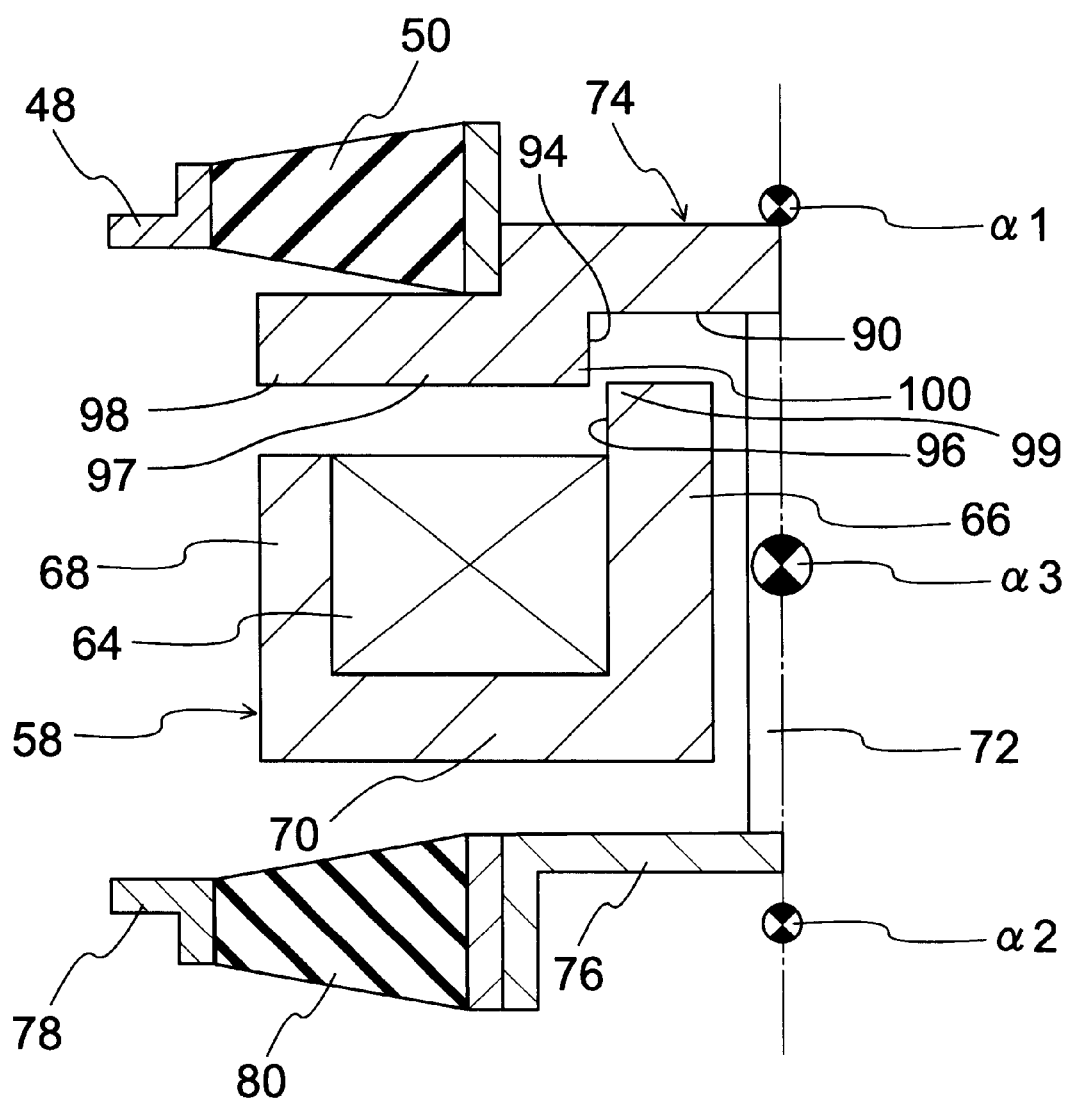
FIG. 5 is a view schematically showing a structure of the actuator used in the engine mount of FIG. 1.

As is apparent from FIG. 5, the engine mount 10 of the present embodiment is further arranged such that the oscillating plate 74 and the stabilizing plate 76 are connected with each other via the connecting rod 72 and are integrally displaced relative to the yoke member in the axial direction. That is, the oscillating and stabilizing plates 74, 76 are fixed to the upper and lower ends of the connecting rod 72 so as to extend in the direction perpendicular to the axial direction, and are elastically supported by the first and second rubber plates 50, 80, respectively, the first and second rubber plates 50, 80 are disposed radially outwardly of the oscillating and stabilizing plates 74, 76, respectively, so as to extend in the direction perpendicular to the axial direction. Thus, the first and second rubber plates 50, 80 are disposed at respective axial positions which are spaced apart from each other with a sufficient axial distance therebetween. This arrangement makes it possible to assure an excellent stiffness of the first and second rubber plates 50, 80 with respect to a vibrational load in the twisting direction, resulting in an excellent positional stability of the oscillating and stabilizing plates 74, 76 in the direction perpendicular to the axial direction, and a resultant further improved stability in the oscillating action of the oscillating plate 74. In FIG. 5, $\alpha 1$ indicates an elastic support center when the oscillating plate 74 is elastically supported solely by the first rubber plate 50, $\alpha 2$ indicates an elastic support center when the oscillating plate 74 is elastically supported solely by the second rubber plate 80, and $\alpha 3$ indicates an elastic support center when the oscillating plate 74 is elastically supported by both of the first and second rubber plates 50, 80. As is apparent from FIG. 5, the elastic center $\alpha 3$ is located on the center axis of the oscillating plate 74 and interposed between the first and second rubber plate 50, 80, and the elastic centers α1, α2 are axially spaced apart from each other on the center axis of the oscillating plate 74 and the protruding end face of the axial protrusion 97 of the oscillating member is located between the elastic centers α1, α2 in the axial direction.

In the present engine mount 10, the oscillating plate 74 is effectively positioned with high stability as described above, so that the oscillating plate 74 is effectively prevented from being inclined even when the oscillating plate 74 is subjected to a load which may possible cause an undesirable inclination of the oscillating plate 74, effectively preventing that the oscillating plate 74 affects adversely on the yoke member 58. This arrangement permits a sufficiently reduced gap between the open-end edge portion 100 of the oscillating plate 74 and the axially upper end portion 99 of the inner circumferential wall portion 66 of the yoke member 58, while effectively avoiding the adverse effect of the inclined oscillating plate 74 on the other components, e.g., collision or contact of the oscillating plate 74 with the other components, resulting in a further improved stability of the oscillating force of the oscillating plate 74 in the axial direction.

While the present invention has been described above in its presently preferred embodiment, it is to be understood that the invention is not limited to the details of the illustrated embodiment, but may be otherwise embodied.

For instance, while the elastic support center α3 upon elastically supporting the oscillating plate 74 by the both of the first and second rubber plates 50, 80 is arranged to be positioned in an generally central portion in the axial direction of an oscillating body including the oscillating plate 74 and the stabilizing plate 76 in the illustrated embodiment, the axial position of the elastic support center α3 is not limited to the illustrated embodiment, but may be arranged to be positioned more closer to the oscillating plate 74, for example. This arrangement is effective to minimize an amount of change of the gap between the open-end edge portion 100 of the oscillating plate 74 and the axially upper end portion 99 of the inner circumferential wall portion 66 of the yoke member 58, which two portions 100, 99 tend to be collide. Therefore, the collision or interference between the oscillating plate 74 and the yoke member 58 is further effectively prevented, resulting in a further improved stability of the motion of the oscillating plate 74.

Figure 6:
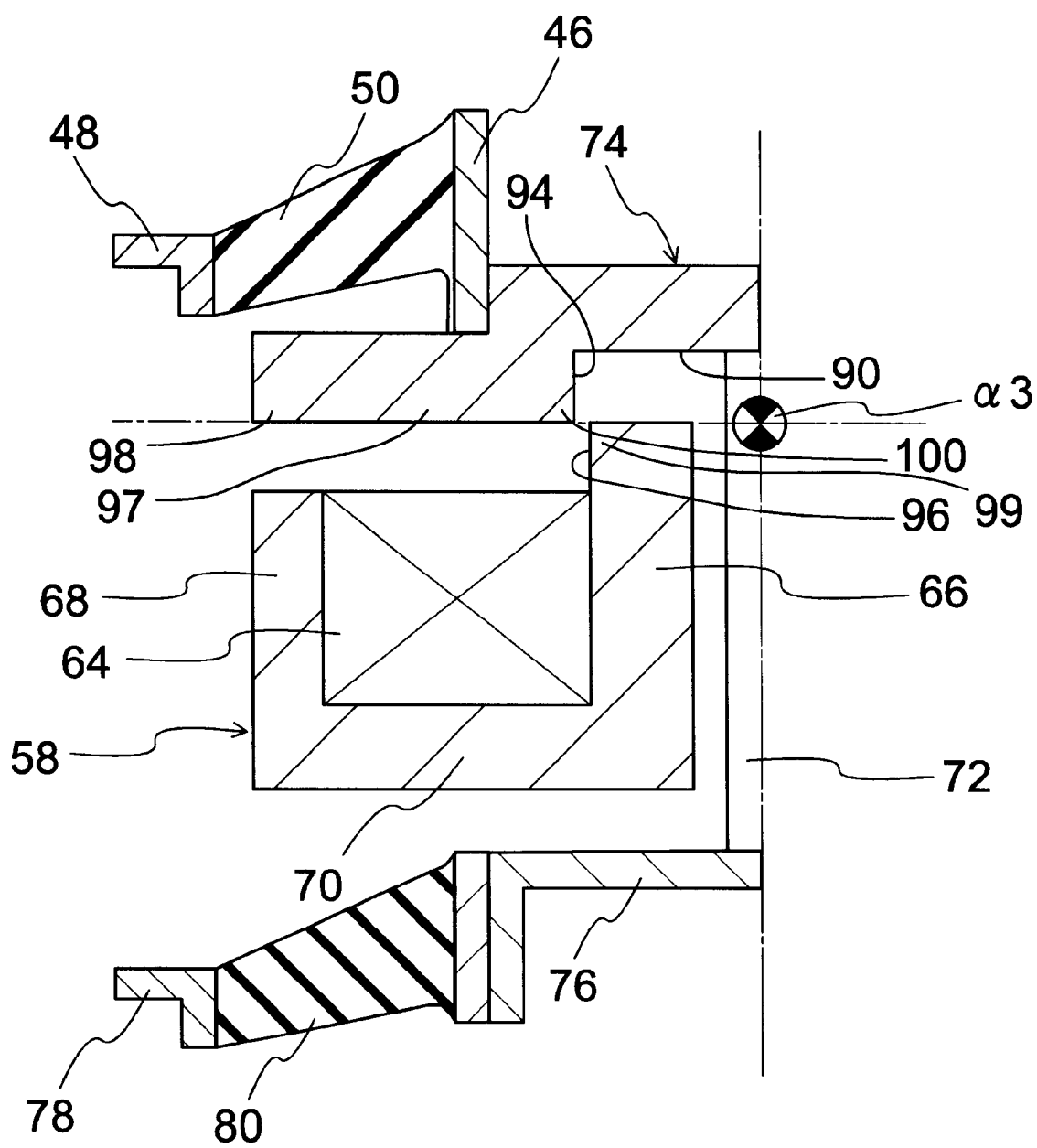
FIG. 6 is a view schematically showing a structure of another actuator usable for the engine mount of FIG. 1.

More specifically described, while referring to FIG. 6, the first and second rubber plates 50, 80 may be modified to have a tapered shape. The first rubber plate 50 extends radially outwardly and axially downwardly from the cylindrical portion of the movable plate 46 to the fixing sleeve 48, while the second rubber plate 80 extends radially outwardly and axially downwardly from the cylindrical portion of the stabilizing plate 76 to the fixing sleeve 78, as seen in FIG. 6. This arrangement permits that the elastic supporting center α3 upon elastically supporting the oscillating plate 74 by the first and second rubber plate 50, 80, moves closer to the oscillating plate 74.

Figure 7:
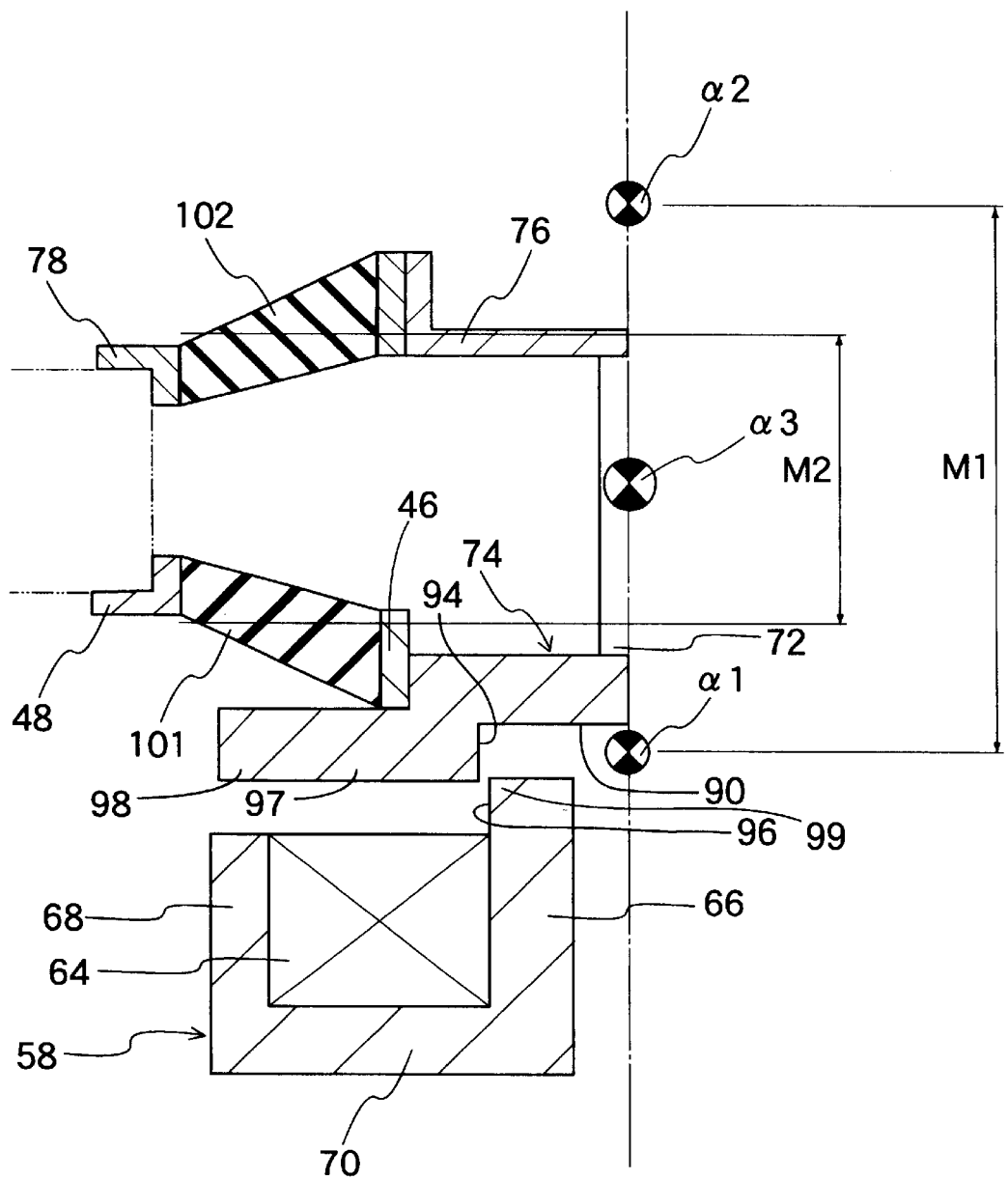
FIG. 7 is a view schematically showing a structure of a further actuator usable for the engine mount of FIG. 1.

Referring next to FIG. 7, there is schematically another modification of the first and second rubber plates 50, 80, wherein both of two rubber plates 101, 102 are disposed on one side of the oscillating plate 74 (axially upper side of the oscillating plate 74 as seen in FIG. 7), and are located at respective axial positions which are spaced apart from each other with a given axial distance therebetween. The rubber plates 101, 102 have respective tapered shape which are symmetric with respect to a center line which passes through the central portion between the axial positions of these two rubber plates 101, 102, and which extends in the direction perpendicular to the axial direction. More specifically described, the rubber plate 101 extends radially outwardly and axially upwardly from the cylindrical portion of the movable plate 46 to the fixing sleeve 48, while the rubber plate 102 extends radially outwardly and axially upwardly from the cylindrical portion of the stabilizing plate 76 to the fixing sleeve 78, as seen in FIG. 7. In this arrangement, the elastic support center α3 upon elastically supporting the oscillating plate 74 by the both of the rubber plates 101, 102 is located in an axial position on the axis of the oscillating plate 74, which is interposed between these rubber plates 101, 102. Further, the elastic support centers α1, α2 upon elastically supporting the oscillating plate 74 solely by the respective rubber plates 101, 102, are spaced apart from each other in the axial direction with an axial distance M1 therebetween, and the distance M1 is arranged to be not smaller than the axial distance M2 between the rubber plates 101, 102 (M1>M2, in this embodiment). This arrangement permits an increased deformation resistance of the oscillating member 74 owing to an effectively increased sprig stiffness of the elastic supporting system utilizing the first and second rubber plates 101, 102, in the direction perpendicular to the axial direction and in the twisting direction.

Figure 8:
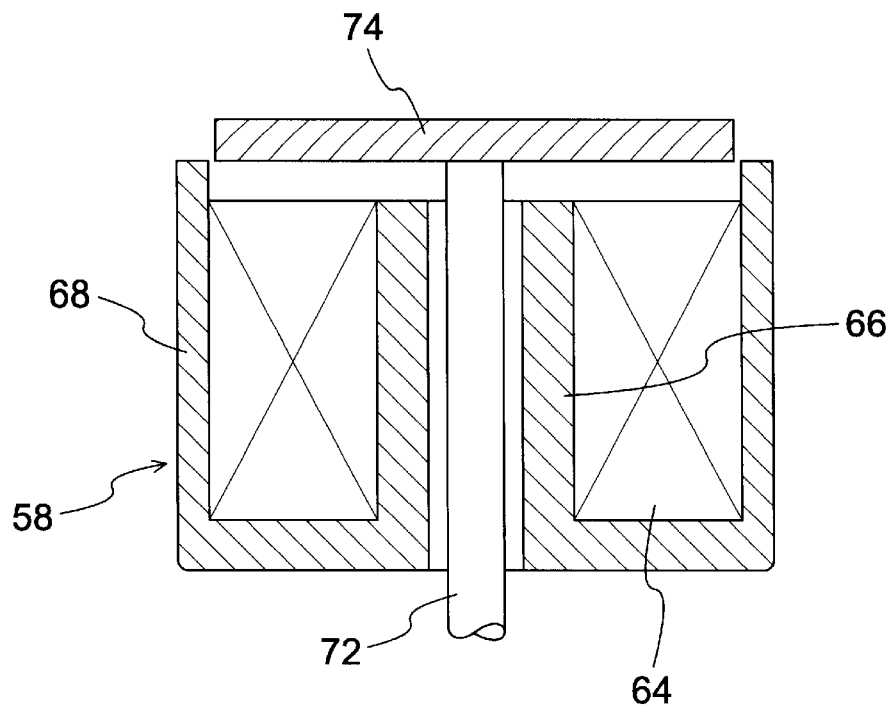
FIG. 8 is a view schematically showing a structure of a still further actuator usable for the engine mount of FIG. 1.
Figure 9:
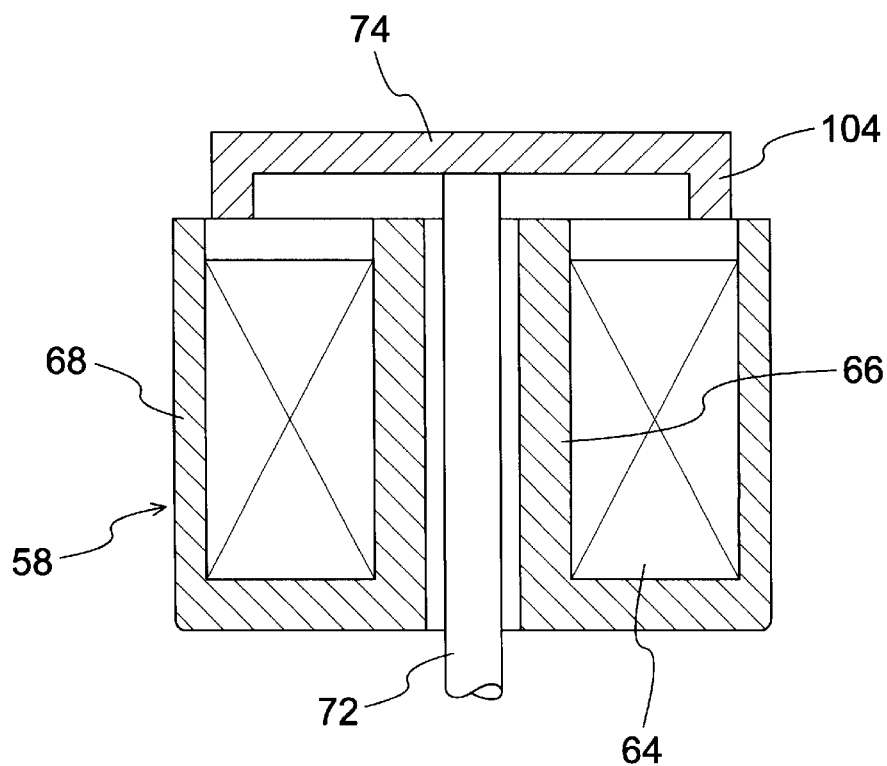
FIG. 9 is a view schematically showing a structure of a yet further actuator usable for the engine mount of FIG. 1.
Figure 10:
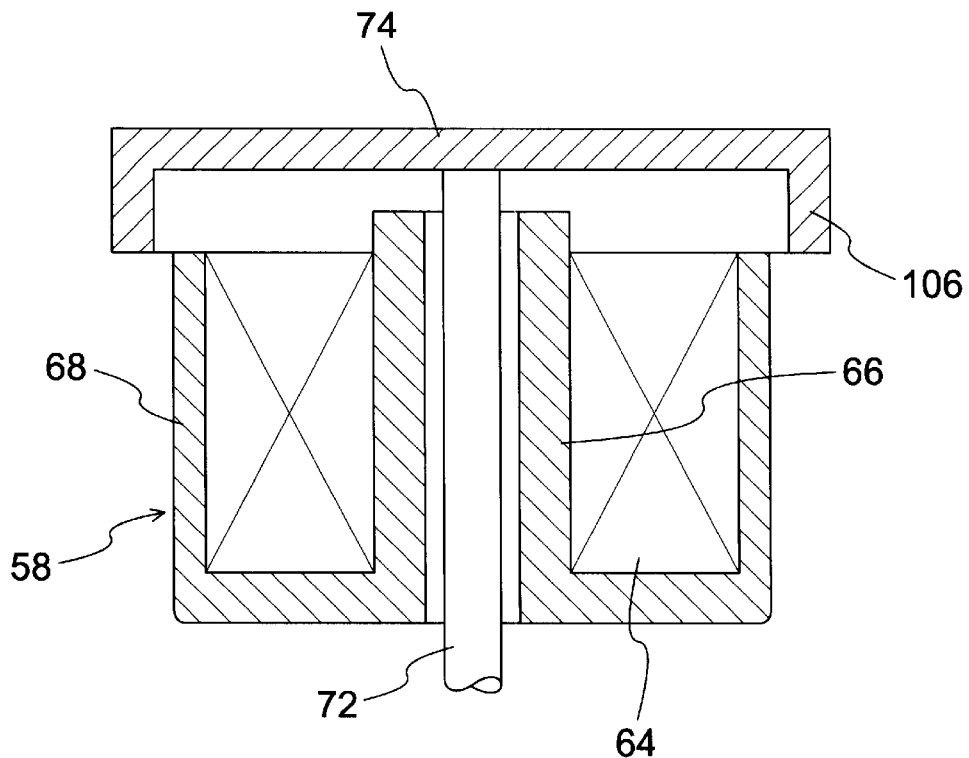
FIG. 10 is a view schematically showing a structure of a still another actuator usable for the engine mount of FIG. 1.

While the actuator 54 used in the engine mount 10 of the illustrated embodiment is arranged such that the axially upper end face of the outer circumferential wall portion 68 of the yoke member 58 is directly opposed in the axial direction to the outer circumferential portion of the oscillating plate 74, while the axially upper end face of the inner circumferential wall portion 66 of the yoke member 58 is opposed to the inner circumferential portion of the oscillating plate 74 in the direction inclined with respect to the axial direction. Contrary to the illustrated embodiment, the actuator may possibly be arranged such that the axially upper end portion of the outer circumferential wall portion 68 of the yoke member 58 and the outer circumferential portion of the oscillating plate 74 have respective portions which are opposed to each other in the direction inclined with respect to the axial direction. The specific examples of an actuator usable for an elastic mount of the present invention are schematically shown in FIGS. 8–10. In the following examples of the actuator, the reference numerals used in the illustrated embodiment will be used to identify the corresponding elements, and no description of these elements will be provided. It should be noted that each of the oscillating plates 74 used in the following examples of the actuators is elastically supported by the two rubber plates which are spaced apart from each other in the axial direction.

Referring to FIG. 8, there is schematically shown one example of the actuator wherein the yoke member 58 is arranged such that the outer circumferential wall portion 68 protrudes axially upwardly from the axially upper end face of the inner circumferential wall portion 66, while the oscillating plate 74 is arranged so as to have a generally plane surface at its axially lower end face. The oscillating plate 74 has a diameter which is slightly smaller than the inner diameter of the outer circumferential wall portion 68 of the yoke member 58.

Referring next to FIG. 9 showing another example of the actuator which includes the yoke member 58 in which both of the inner and outer circumferential wall portions 66, 68 protrude in the axially upwardly by a given axial distance, and the oscillating plate 74 which has a generally plane surface at its axially lower end face and has an annular protrusion 104 integrally formed at the outer peripheral portion of the lower plane surface of the oscillating plate 74 so as to protrudes axially downwardly as seen in FIG. 9. The annular protrusion 104 has the outer diameter which is slightly smaller than that of the inner diameter of the outer circumferential wall portion 68.

Referring next to FIG. 10 showing a yet another example of the actuator, the actuator includes the yoke member 58 which is same in construction as the yoke member 58 used in the illustrated embodiment, namely, in which the inner circumferential wall portion 66 protrudes axially upwardly from the axially upper end face of the outer circumferential wall portion 68. The actuator also includes the oscillating plate 74 which has a generally plane surface at its axially lower end face and has an annular protrusion 106 integrally formed at the peripheral portion of the lower plane surface of the oscillating plate 74 so as to protrudes axially downwardly as seen in FIG. 10. The protrusion 106 has an inner diameter which is slightly larger than the outer diameter of the outer circumferential wall portion 68.

In the thus constructed actuators as shown in FIGS. 8–10, the axially upper end face of the inner circumferential wall portion 66 is directly opposed in the axial direction to the radially inner portion of the oscillating plate 74, whereby an effective magnetic attraction is applied to the oscillation plate 74. On the other hand, the axially upper end face of the outer circumferential wall portion 68 is opposed to the radially outer portion of the oscillating plate 74 in the direction inclined with respect to the axial direction. Thus, these actuator are capable of reducing the variation of the oscillating force due to the variation of the initial position of the oscillating plate 74 relative to the yoke member 58 in the axial direction, and accordingly are capable of applying a stable oscillating force to the oscillating plate 74, thereby exhibiting the desired effect as in the actuator 54 used in the illustrated embodiment.

In the active-type fluid-filled elastic mount according to the present invention, the structure of an actuator which constitutes an electromagnet-type oscillating force generator is not particularly limited, provided at least one of the axially upper end portions of the inner and outer circumferential wall portions of the yoke member is directly opposed in the axial direction to the inner and/or outer circumferential portions of the oscillating member, and at least the other axially upper end portions of the inner and outer circumferential wall portions of the yoke member is opposed to in the direction inclined to the axial direction to the inner and/or outer circumferential portions of the oscillating member, while being offset from the inner and/or outer circumferential portions in the direction perpendicular to the axial direction. For instance, it may be possible that the inner or outer circumferential wall portion whose axially upper end face is directly opposed to the inner or outer circumferential portion of the oscillating member, further includes a portion which is offset in the direction perpendicular to the axial direction from and is opposed in the direction inclined with respect to the axial direction to the inner or outer circumferential portion of the oscillating member. In addition, it may be possible that the inner or outer circumferential wall portion whose axially upper end portion is opposed in the axially inclined direction to the inner or outer circumferential portion of the oscillating member, while being offset from the inner or outer circumferential portion of the oscillating member, further includes a portion which is directly opposed to the inner or outer circumferential wall portion in the axial direction.

Figure 11:
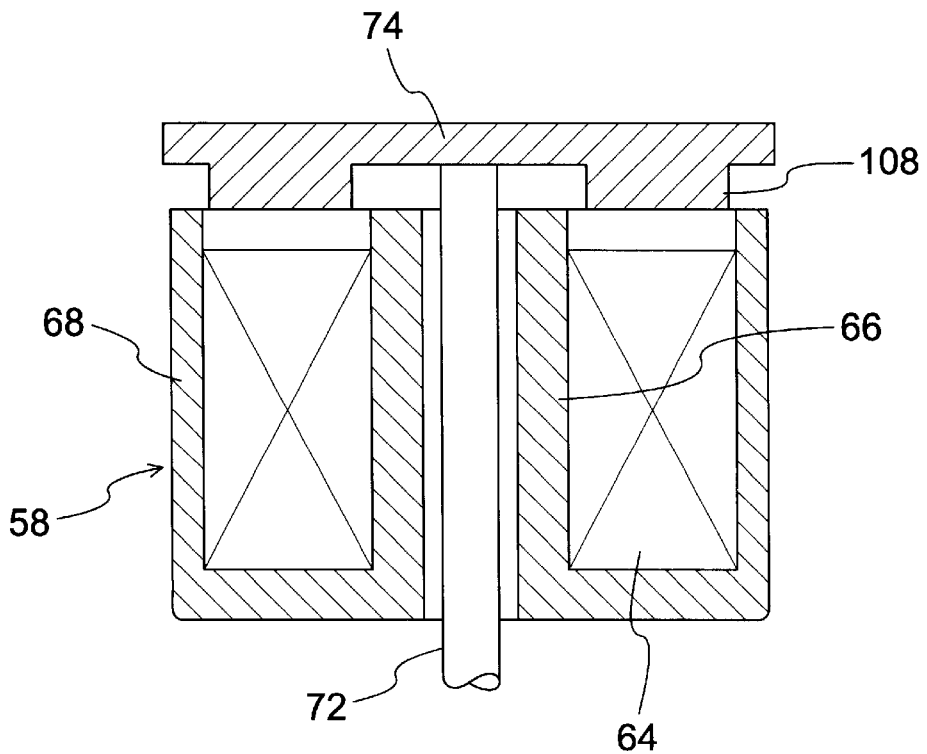
FIG. 11 is a view schematically showing a structure of a yet another actuator usable for the engine mount of FIG. 1.

Specific example of this type of actuator is schematically illustrated in FIG. 11, wherein both of the inner and outer circumferential wall portions 66, 68 protrude axially upwardly by a given axial distance, while the oscillating plate 74 has a generally plane surface at its axially lower end face and an annular protrusion 108 integrally formed at the radially intermediate portion of its lower plane surface so as to protrudes axially downwardly as seen in FIG. 11. The annular protrusion 108 has an inner diameter which is slightly larger than the outer diameter of the inner circumferential wall portion 66, and an outer diameter which is slightly smaller than the inner diameter of the outer ircumferential wall portion 68. In the thus constructed actuator, the axially upper end faces of the inner and outer circumferential wall portions 66, 68 are directly opposed in the axial direction to the inner and outer circumferential portions of the axially lower end face of the oscillating plate 74. Further, the annular protrusion 108 is opposed at its radially inner open-end edge portion to the radially outer open-end edge portion of the inner circumferential wall portion 66 in the axially inclined direction, and at its radially outer open-end edge portion to the radially inner open-end edge portion of the outer circumferential wall portion 68 in the axially inclined direction. Therefore, the actuator of FIG. 11 is capable of effectively reducing the variation of the oscillating force due to the variation of the initial position of the oscillating plate 74 relative to the yoke member 58, making it possible to applying a desired oscillating force to the oscillating plate 74 with high stability, resulting in excellent vibration damping effect as in the actuators 58 used in the illustrated embodiment. With respect to the actuator of FIG. 11, it is also noted the oscillating plate 74 is elastically supported by the two elastic support members which are disposed in the respective axial positions which are spaced apart from each other in the axial direction.

The present invention may be applicable to a engine mount for a FF (front-engine/front-drive) motor vehicle, which includes an inner sleeve member as a first mounting member and an outer sleeve member as a second mounting member disposed radially outwardly of the inner sleeve member, that are elastically connected with each other by an elastic body interposed therebetween, other than the illustrated engine mount.

While the present invention is embodied in the form of the engine mount for an automotive vehicle in the illustrated embodiment, the principle of this invention is equally applicable to other types of fluid-filled vibration damping devices, such as body mounts and differential mounts, for automotive vehicles, and fluid-filled dampers for various machines and other equipment other than automotive vehicles.

The specific structure of the orifice passage 42 and the fluid passage 86 is not limited to the illustrated embodiment, but may be suitably changed depending upon a desired vibration damping characteristics or a fundamental structure of the vibration damping device.

The engine mount 10 need not have the partition member 34 so that the primary and auxiliary fluid chambers 35, 52 are integrated to form a single fluid chamber partially defined by the elastic body 16 and the movable plate 44.

It is to be understood that the present invention may be embodied with various other changes, modifications and improvements which may occur to those skilled in the art without depending from the spirit and scope of the invention defined in the following claims:

What is claimed is:

1. A fluid-filled active elastic mount interposed between two members of a vibration system comprising:

a first mounting member and a second mounting member which are spaced-apart from each other, and which are attachable to said two members of the vibration system, respectively;

an elastic body elastically connecting said first and second mounting members and partially defining a fluid chamber filled with a non-compressible fluid;

a movable plate partially defining said fluid chamber and being displaceable to change a pressure of said fluid in said fluid chamber; and an actuator adapted to oscillate said movable plate and constituted by an oscillating force generator including a yoke member made of a magnetic material and having an annular groove open in one of axially opposite end faces thereof such that said yoke member has an inner and an outer circumferential wall portion which are cooperate to partially define said annular groove, a coil disposed in said annular groove of said yoke member, and an oscillating member made of a magnetic material and disposed opposite to said one end face of said yoke member in an axial direction of said yoke member with a predetermined axial distance therebetween, said yoke member being fixedly supported by said second mounting member, while said oscillating member being fixed to said movable plate, to thereby constitute said actuator, said coil being energized by an electric current applied thereto, so as to form a magnetic circuit around said coil such that said inner and outer circumferential wall portions of said yoke member are magnetized as respective opposite magnetic poles at open end portions thereof, and so as to generate a magnetic force acting on said oscillating member so that an oscillating force is generated between said oscillating member and said yoke member in said axial direction, at least one of said open end portions of said inner and outer circumferential wall portions of said yoke member being directly opposed in said axial direction to an inner and/or an outer circumferential portion of said oscillating member, said inner and outer circumferential portions of said oscillating member being located nearest to said open end portions of said inner and outer circumferential wall portions of said yoke member, respectively, said oscillating member having an axial protrusion extending axially outwardly toward said yoke member, said axial protrusion having a predetermined diameter so that said axial protrusion is locatable radially inwardly and/or outwardly of at least the other of said open end portion of said inner and outer circumferential wall portions of said yoke member, and having at least one edge portion which is opposed to said open end portion of said inner and/or outer circumferential wall portions of said yoke member in a direction inclined to said axial direction; and said oscillating member being elastically supported by a first and a second elastic support member disposed at respective axial positions which are spaced apart from each other in said axial direction, with respect to said respective axial positions on the side of said yoke member.

2. A fluid-filled active elastic mount according to claim 1, wherein said first and second elastic support members being disposed on opposite sides of a protruding end face of said axial protrusion of said oscillating member, respectively, and being arranged such that a resultant elastic support center for elastically supporting said oscillating member by said first and second elastic support members is located on a center axis of said oscillating member and interposed between said first and second elastic support members in said axial direction, said resultant elastic support center being located closer to said protruding end face of said axial protrusion than a first or a second elastic support center for elastically supporting said oscillating member solely by said first or second elastic support member.

3. A fluid-filled active elastic mount according to claim 2, wherein said first and second elastic support members being disposed on axially opposite sides of said yoke member and said coil, respectively, and being connected with each other via a connecting rod which extends through said yoke member and said coil in said axial direction, while being movable relative to said yoke member and said coil in said axial direction.

4. A fluid-filled active elastic mount according to claim 1, wherein said protruding end face of said axial protrusion of said oscillating member being located in said axial direction between a first elastic support center for elastically supporting said oscillating member solely by said first elastic support member and a second elastic support center for elastically supporting said oscillating member solely by said second elastic support member.

5. A fluid-filled active elastic mount according to claim 1, wherein at least one of said first and second elastic support members being an rubber plate member extending in a direction substantially perpendicular to said axial direction.

6. A fluid-filled active elastic mount according to claim 5, wherein said rubber plate member including a tapering position which extends radially outwards and axially outwards or inwards from an radially inner portion of said rubber plate member.

7. A fluid-filled active elastic mount according to claim 5, wherein at least one of said first and second elastic support members having an annular shape and being connected at an inner circumferential surface thereof with said movable plate and at an outer circumferential surface thereof with said yoke member.

8. A fluid-filled active elastic mount according to claim 1, wherein said first and second elastic support member being constituted by a first and a second annular rubber plate member, respectively, said first and second annular rubber plate members being connected at outer circumferential surfaces thereof with said yoke member, and at inner circumferential surfaces thereof with a first and a second rigid support member, respectively, said first and second rigid support members being rigidly connected with each other, while being fixed to said oscillating member.

9. A fluid-filled active elastic mount according to claim 1, wherein said first and second elastic support members being disposed on one side of axially opposite sides of a protruding end face of said axial protrusion of said oscillating member, and being arranged such that a resultant elastic support center for elastically supporting said oscillating member by said first and second elastic support members is located on a center axis of said oscillating member and interposed between said first and second elastic support members in said axial direction, and a first elastic support center for elastically supporting said oscillating member solely by said first elastic support member and a second elastic support center for elastically supporting said oscillating member solely by said second support member are located on a center axis of said oscillating member and axially spaced apart from each other with an axial distance therebetween that is not smaller than an axial distance between said axial positions of said first and second elastic support members.

10. A fluid-filled active elastic mount according to claim 1, wherein a distance between said open end portion of said inner or outer circumferential wall portion and said edge portion of said axial protrusion of said yoke member in said direction inclined to said axial direction is made not larger than a distance between said at least one of said open end portions of said inner and outer circumferential wall portions of said yoke member and said inner and/or outer circumferential portions of said movable member which are directly opposed to each other in said axial direction.

11. A fluid-filled active elastic mount according to claim 1, wherein said inner circumferential wall portion of said yoke member axially outwardly protrudes from said open end portion of said outer circumferential wall portion of said yoke member, while said axial protrusion of said oscillating member has an inner diameter larger than an outer diameter of said inner circumferential wall portion of said yoke member, said inner circumferential wall portion of said yoke member having an outer circumferential edge in said open end portion thereof, while said axial protrusion having at an open end portion thereof an inner circumferential edge portion which is opposed to said outer circumferential edge portion in said direction inclined with respect to said axial direction, and said outer circumferential wall portion of said yoke member being directly opposed at an open end face thereof to said outer circumferential portion of said oscillating member in said axial direction.

12. A fluid-filled active elastic mount according to claim 1, wherein said second mounting member having a cylindrical fixing portion and said first mounting member being disposed on one of opposite open ends of said cylindrical fixing portion of said second mounting member, said first and second mounting member being connected with each other by said elastic body interposed therebetween so that said one open end of said cylindrical fixing portion of said second mounting member is fluid-tightly closed by said elastic body, while the other open end of said cylindrical fixing portion of said second mounting member is fluid-tightly closed by a flexible diaphragm, said movable plate being accommodated in an axially intermediate portion of said cylindrical fixing portion of said second mounting member, and being elastically supported by said first elastic support member in the form of a first rubber plate with respect to said axially intermediate portion of said second mounting member, so as to fluid-tightly divide an interior space of said cylindrical fixing portion of said second mounting member into two sections one of which is partially defined by said elastic body and provided as said fluid chamber filled with said noncompressible fluid, and the other of which is partially defined by said flexible diaphragm and adapted to accommodate said actuator therein such that said yoke member of said actuator being fixedly supported by said cylindrical fixing portion of said second mounting member and said oscillating member being elastically supported also by said second elastic support member in the form of a second rubber plate, which is dispose on said axial position so as to cooperate with said flexible diaphragm to define therebetween an equilibrium chamber filled with non-compressible fluid and having a volume which is variable based on deformation of said flexible diaphragm, said fluid-filled elastic mount further comprising a fluid passage for fluid communication between said equilibrium chamber and said fluid chamber.

13. A fluid-filled active elastic mount according to claim 12, said elastic mount further comprising: a partition member supported by said second mounting member so as to divide said fluid chamber into a primary fluid chamber partially defined by said elastic body and an auxiliary fluid chamber partially defined by said movable plate; and an orifice passage for fluid communication between said primary and auxiliary fluid chamber.

14. A fluid-filled active elastic mount according to claim 13, wherein one of said first and second mounting members is attached to a power unit of an automotive vehicle and the other of said first and second mounting members is attached to a body of the automotive vehicle, said fluid passage being tuned so that said elastic mount exhibits a vibration damping effect with respect to low frequency vibrations corresponding to a vibration of engine shakes, while said orifice passage being tuned so that said elastic mount exhibits a low dynamic spring constant with respect to an medium or high frequency vibrations corresponding to a vibration of engine idling.

* * * * *